US010486485B1

(12) United States Patent
Levinson et al.

(10) Patent No.: US 10,486,485 B1
(45) Date of Patent: Nov. 26, 2019

(54) PERCEPTION BASED SUSPENSION CONTROL

(71) Applicant: Zoox, Inc., Menlo Park, CA (US)

(72) Inventors: Jesse Sol Levinson, Redwood City, CA (US); Johannes Edren, Belmont, CA (US); Ali Javidan, Sunnyvale, CA (US); Timothy David Kentley-Klay, Stanford, CA (US); Joseph Funke, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 192 days.

(21) Appl. No.: 15/491,346

(22) Filed: Apr. 19, 2017

(51) Int. Cl.
B60G 17/0165 (2006.01)
B60G 17/019 (2006.01)
B60W 10/20 (2006.01)
B60W 10/22 (2006.01)
B60G 17/018 (2006.01)
B60G 17/016 (2006.01)
B60W 50/00 (2006.01)

(52) U.S. Cl.
CPC ....... B60G 17/0182 (2013.01); B60G 17/019 (2013.01); B60G 17/0162 (2013.01); B60G 17/0165 (2013.01); B60W 10/20 (2013.01); B60W 10/22 (2013.01); B60W 50/0098 (2013.01); B60G 2204/62 (2013.01); B60G 2400/821 (2013.01); B60G 2400/823 (2013.01); B60G 2400/824 (2013.01); B60W 2550/147 (2013.01)

(58) Field of Classification Search
CPC ......... B60G 17/0182; B60G 2400/824; B60G 2400/823; B60G 2400/821; B60G 2204/62; B60G 17/019; B60G 17/0165; B60G 17/0162; B60W 2550/147; B60W 50/0098; B60W 10/22; B60W 10/20
See application file for complete search history.

(56) References Cited

U.S. PATENT DOCUMENTS 7,466,339 B2    12/2008  Usami
9,509,962 B2    11/2016  Chundrlik, Jr. et al.
9,702,349 B2 *   7/2017  Anderson ............ B60G 17/019
9,835,719 B2 * 12/2017  Nguyen ................. G01S 13/02
9,905,015 B2 *   2/2018  Dane ................... G06K 9/00798
2014/0222287 A1  8/2014  Popham et al.

* cited by examiner

Primary Examiner — Hunter B Lonsberry
Assistant Examiner — Mathew Franklin Gordon
(74) Attorney, Agent, or Firm — Lee & Hayes, P.C.

(57) ABSTRACT

Vehicle ride can be improved using perception based suspension control on a vehicle. A computing system on the vehicle may receive a map of a road surface. The computing system may identify a trajectory of the vehicle relative to the road surface, and determine if a deformation exists in a track of one of the vehicle tires. The deformation may include a depression and/or a raised portion from the road surface. The computing system may calculate an adjustment to make to one or more suspension system components to negate or minimize the effects of the vehicle traveling over the deformation or roughness of the road, and may send an instruction to adjust the suspension components accordingly. Additionally, or alternatively, the computing system may determine that the deformation may be avoidable, in whole or in part, and may cause the vehicle to maneuver around the deformation.

21 Claims, 9 Drawing Sheets

PERCEPTION BASED SUSPENSION CONTROL

BACKGROUND

Suspension systems have been used on vehicles for hundreds of years. Most vehicle suspension systems on the road today include components, such as tires, springs, shock absorbers, and linkages, which are configured to improve, among other things, ride comfort for occupants. In many vehicles, the components are configured to react to forces imparted by various movements of the vehicle, such as a turn or a wheel rolling over a deformation (e.g., a bump or pothole). While the components may dampen the forces, the effects of the deformation may still be felt by occupants, thereby decreasing ride comfort.

To further improve the suspension systems, some vehicles may include sensors to scan a short distance ahead, and inform the suspension system of upcoming deformations that may impart forces thereon. The suspension system may adjust components to react to the detected deformation and impending forces. However, because these systems are limited to scanning a short distance ahead of the vehicle with low resolution sensors, the augmented suspension systems may not be able to adjust each of the affected suspensions on the vehicle for the impending forces. Therefore, the suspension systems used today are unable to maximize force dampening across both axles and to optimize ride comfort.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
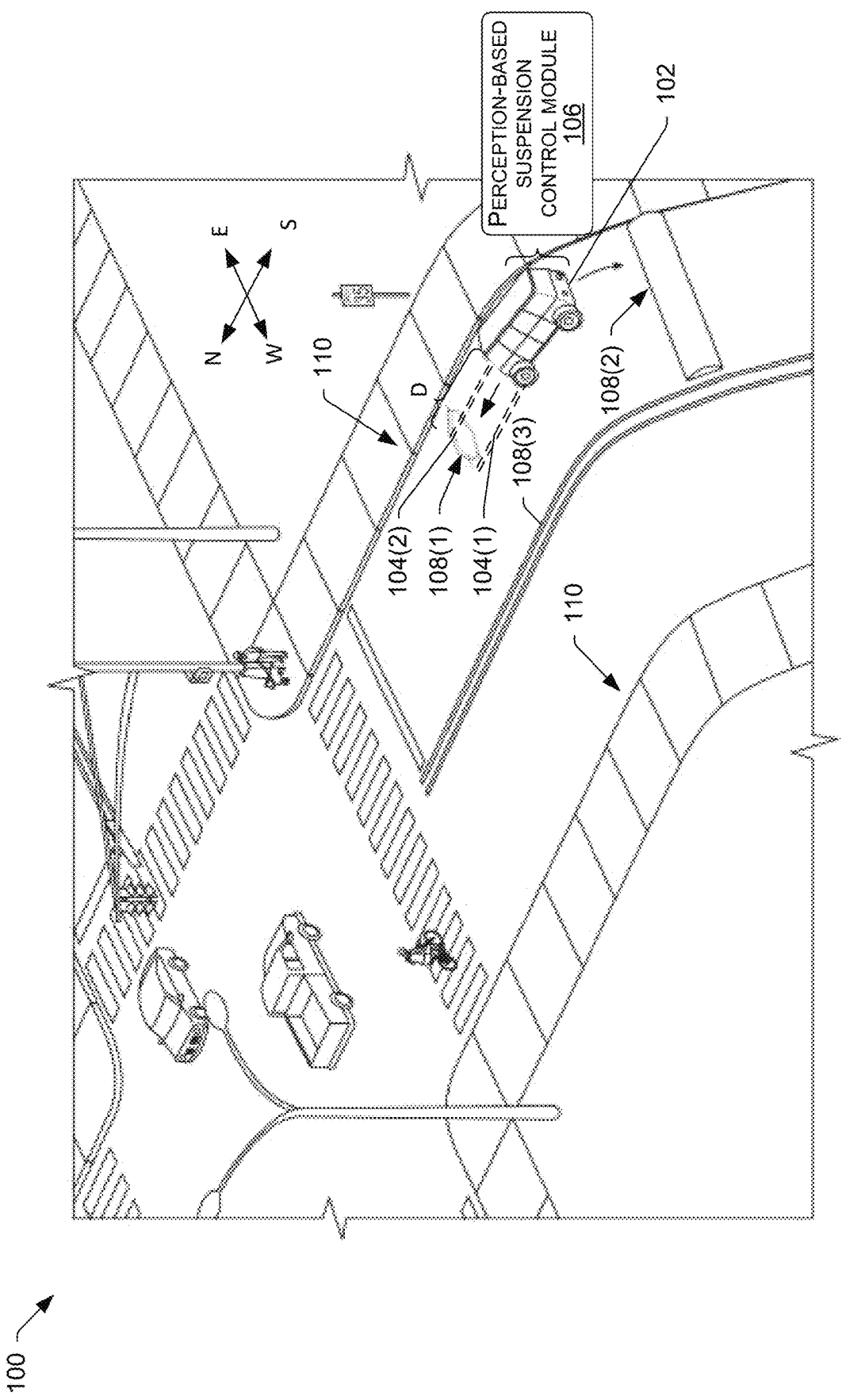
FIG. 1 is an environment in which a vehicle with an example perception based suspension control system may operate.

This disclosure is generally directed to techniques and devices for optimizing ride comfort for vehicle occupants using online and offline perception based motion control and suspension control on a vehicle. A computing device on the vehicle may receive a height map (e.g., global height map) from a global map server. The global height map may be generated by the global map server. The global height map may include a 2.5- or 3-dimensional (2.5D or 3D) representation of the road surface. In some examples, the global height map may be a high resolution (e.g., millimeter scale, such as 3 mm) representation of the road surface. The computing device may receive localization data from one or more sensors and/or navigation system transceivers on the vehicle, and may localize the vehicle relative to the global height map. The computing device may determine a trajectory (e.g., direction of movement) of the vehicle with respect to the global height map.

Based on the location and trajectory of the vehicle relative to the global height map, the computing device may determine one or more deformations (e.g., deformity of the road surface, added material on road surface, obstacle, etc.) in the path (e.g., in a track of the tires) of the vehicle. The deformations may include deviations from a flat surface of the road. The deviations may include raised sections (e.g., speed bumps, lane markers, etc.) and/or depressions (e.g., dips in the road, rumble strips, potholes, etc.). In various examples, the computing device may determine to adjust a trajectory of the vehicle to avoid the deformation in the path. In some examples, the computing device may send a signal to one or more suspension systems of the vehicle to adjust one or more components such as shock absorbers, control arms, stabilizers (e.g., sway bars, anti-roll bars, torsion bars, etc.) to minimize or negate effects of the deformation and/or the trajectory adjustment to avoid the deformation. The one or more components may comprise active and/or semi-active suspension system components.

For example, the global height map may depict a depression in the road surface. The computing device may determine that the depression is in the planned path of a right track of the vehicle (i.e., a path of the right-side wheels of the vehicle). Responsive to the determination, the computing device may send a signal instructing the right-side suspension systems to limit or prevent movement of the suspension so that the tire tracking toward the depression does not drop into the depression. Additionally, or alternatively, the signal may include an instruction to add force to an active stabilizer bar to remove load from the tire tracking toward the depression and transfer it to other tires, to allow the vehicle to glide over the depression. In various examples, the instructions to the front and rear suspension systems may include a time component, to ensure the respective suspension system adjusts at a location corresponding to the deformation. In such examples, the time component may be based on a speed of the vehicle, a location of the vehicle on the global height map, a planned course (e.g., series of planned trajectories) and/or speed adjustments, and the like. For another example, the global height map may depict a raised section in the road surface. The computing device may determine that the raised section is in the planned path of the left track of the vehicle. Responsive to the determination, the computing device may send a signal instructing the left-side suspension systems to soften the suspension and/or retract the tire to minimize or avoid the impact with the raised section.

In various examples, the computing device may be configured to receive sensor data from one or more sensors of the vehicle. The sensor(s) may include image capture devices (e.g., RGB cameras, intensity cameras, IR cameras, stereo cameras, depth cameras, etc.), motion sensors (e.g., rotary (wheel) encoders, inertial measurement units (IMU) sensors, etc.), light detection and ranging (LIDAR) sensors, radio detection and ranging (RADAR) sensors, sound navigation and ranging (SONAR) sensors, global positioning system (GPS) sensor, inertial navigation system (INS) sensors, microphones, accelerometers, gyroscopes, magnetometers, environmental sensors (e.g., ambient temperature gauge, road surface temperature gauge, humidity sensor, and barometric pressure sensor, etc.), and/or other types of sensors for operating and/or controlling the vehicle. In some examples, the computing device may process the sensor data, and may confirm the existence of the deformation in the road, as depicted on the height map. In some examples, a confirmation of the existence of the deformation may include comparing perception sensor data (e.g., from cameras, LIDAR sensors, RADAR sensors, etc.) to the height map to determine changes to the deformations on the road. For example, using the pothole example from above, a camera on the vehicle may capture an image of the road ahead of the vehicle. The computing device may receive the image from the camera, and may recognize the pothole in the image. The computing device may compare the current width and length of the pothole (e.g., as depicted in the image) to the width and length of the depiction of the pothole in the global height map. The computing device may determine that at least the current width and length are substantially the same as what is depicted in the global height map. The computing device may confirm (i.e., validate) the existence of the pothole, and may send signals to the relevant suspension systems based at least in part on the confirmation.

In some examples, the computing device may process the sensor data (e.g., perception sensor and/or location sensor data) and may build a local height map of the road. In various examples, the perception sensor data may include data from cameras and/or distance sensors (e.g., LIDAR sensor, RADAR sensor, etc.). In such examples, the computing device may use stereo images, structure from motion, and/or distances to objects to determine one or more points of the local height map. The computing device may compare the local height map to the global height map, and may confirm the existence of the deformation in the road. For example, a comparison of the local height map and the global height map may show that the pothole described above was repaired (i.e., filled in), and the computing device need not cause the suspension system to adjust for the effects of the pothole.

The computing device may send the local height map and/or the sensor data to the global map server to generate and/or update the global height map. In some examples, the computing device may send the local height map based on detected differences between the local height map and the global height map. In various examples, the computing device may periodically or continuously send the local height map and/or sensor data to the global map server. The global map server may receive local height map and/or sensor data from multiple vehicle computing devices to generate and/or update a "crowd sourced" global height map.

When the global height map is first built, the global map server may receive local height map data and/or sensor data from multiple vehicles. In some examples, the global map server may receive raw sensor data (e.g., data from sensor without additional processing) and may isolate data corresponding to a road surface. In some examples, the raw sensor data may be represented as three-dimensional LIDAR data having coordinates (e.g., Cartesian, polar, etc.) corresponding to positions or distances. The raw sensor data may be represented in a voxel space, which may include representing the data in a grid of volume elements ("voxels") in three-dimensional space. The global map server may be configured to determine voxels, and sensor data associated therewith, that are associated with the road surface.

The global map server may use the partitioned data to build the global height map. In some examples, the raw sensor data may include data from one or more perception sensors, such as cameras, LIDAR sensors, etc. In such examples, the computing device may use stereo images, structure from motion, and/or distances to objects to determine one or more points (e.g., representations of heights) of the global height map. In at least one example, the one or more points may be determined using sensor fusion between laser data and camera data. As used herein, the term "global map" or "global height map" relates a high resolution 2.5D or 3D map of road surfaces and surrounding deformations (e.g., curb, rumble strip, etc.). The global height map may be generated and/or updated based on height map data and/or sensor data compiled by computing devices of multiple vehicles. The global height map may cover a large area (e.g., city blocks, cities, counties, regions, etc.).

As used herein, the "local height map" or "local height map data" relates to a map or a data structure generated relative to a computing device of a vehicle, or other observer. The local height map may be generated by the computing device based on the sensor data from one or more perception and/or location sensors of the vehicle. The local height map may be generated relative to a location of the vehicle, and may include a small area (e.g., within a viewing area of the vehicle sensors) proximate to the vehicle. Local height map data may include raw sensor data, such as, for example, image data from one or more cameras, data from one or more object detection systems (e.g., LIDAR, RADAR, SONAR, etc.), and/or GPS and/or other navigation and/or location detection systems, such as simultaneous localization and mapping (SLAM) based systems.

In some examples, the local height map data may also include a map constructed from the raw sensor data from multiple sensors on the vehicle and fused together into a local height map. In other words, rather than simply sending raw sensor data from, for example, a camera and a LIDAR system of a vehicle, the computing device may process the raw sensor data into a 2.5D or 3D local height map, which may include location data, a timestamp, and deformations on a road surface proximate to the vehicle. In such examples, the local height map may be directly (or more directly) compared to relevant portions of the global height map to accurately determine the position of the vehicle relative to the global height map, and for updating the global height map.

The global map server may receive local height map data from multiple computing devices continuously or on a periodic schedule. The global map server may update the global height map based on the local height map data. In some examples, as will be described in detail below, the global map server may compare the local height map data to a relevant portion of the global height map to determine if there are differences between the two maps. The global map server may recognize differences in the deformations (e.g., change to deformation, removal of deformation, additional deformation perceived, etc.), and may update the global height map accordingly. For example, a first local height map may depict a speed bump present on a road. The global map server may identify the change to the road surface based on the newly installed speed bump. The global map server may update the global height map to depict the raised road surface caused by the speed bump.

In various examples, the global map server may validate the change to the height map prior to updating the global height map. In such examples, the global map server may validate the change by receiving one or more local height maps from other vehicles depicting the same change. In some examples, the global map server may validate the change based on an identification of the detected deformation and/or a confidence in the identification of the deformation. A confidence may be based on a number of sensors that captured data corresponding to the deformation, a resolution of the sensors that captured data corresponding to the deformation, pre-determined shapes and/or sizes of particular deformations, a number of vehicles from which the deformation data was received, or the like. For example, a computing device of a vehicle may recognize the new speed bump installed on the road. Based on a high confidence (e.g., greater than 70%) determined by the computing device that the deformation is a speed bump, the global map server may not require validation prior to updating the global height map. Conversely, the computing device may assign a low confidence (e.g., lower than 50%) to a new pothole detected on the road. Based at least in part on the low confidence, the global map server may require validation by one or more other computing devices prior to updating the global height map.

As discussed above, the global map server may periodically and/or continuously update the global height map. The global map server may send the updated map to multiple vehicles with perception based suspension systems. The global map server may send the updated map periodically, such as on a schedule (e.g., hourly, daily, etc.) and/or when updates are made to the global height map. In some examples, the global map server may send updated maps when updates are made relevant to a location of the respective vehicles. For example, an autonomous vehicle with a perception based suspension system may be assigned to operate within city limits. The global map server may thus send an updated global height map to the computing device associated with the autonomous vehicle based on changes to the road surfaces within the city limits or within a predetermined proximity of the vehicle. In some examples, only portions of the global map may be sent to the vehicle. As a non-limiting example, a portion of the global map server may be sent to a vehicle based on the geographic location of the vehicle such that the vehicle has height map data for a given region.

The multiple vehicles may receive the updated global height map, and may identify deformations in the road relative to the vehicle. In various examples, the computing devices of the vehicles may plot a course of the vehicle based at least in part on the updated global height map. In such examples, the computing device may be able to identify relevant deformations. In some examples, the course of the vehicle may include course deviations, such as a planned lane change or a turn. In such examples, the computing device may also identify relevant effects of the course deviations on the vehicle. In various examples, the computing device may combine deformation data and course deviation data, and may send signals to the relevant suspension systems to adjust components based on the combined data. In some examples, height map information may be used to calculate a trajectory (i.e. an incremental portion of a path or route) which would have the least impact on a passenger of the vehicle. As a non-limiting example, such trajectories may include switching lanes to avoid a pothole.

In addition to the course deviations, the computing device may identify accelerations and/or decelerations relative to a course associated with the vehicle. The accelerations and/or decelerations may be due to planned (e.g., change of speed limit), or unplanned (e.g., detected pedestrian in the road ahead of the vehicle) conditions. The computing device may cause the suspension systems to adjust in order to negate the effects of the accelerations and/or decelerations of the vehicle, and optimize the ride comfort for occupants.

In various examples, the computing device may determine a baseline setting for the suspension systems on the vehicle based on a road surface and/or condition. In such examples, the computing device may adjust each vehicle suspension system to the baseline setting. The baseline setting may be determined based on various factors, such as a roughness of the road, a friction coefficient of the road, a driver preference or manual setting, or the like. The baseline setting may provide for high frequency isolation of road noise and/or effects on a particular road surface. The computing device may thus combine the high frequency isolation performed by each suspension system with the low frequency isolation performed by relevant suspension systems based on detected deformations to optimize ride comfort for occupants. For example, a vehicle traveling on a freshly paved surface may have a low baseline setting (e.g., 1 out of 5) based on the smoothness of the freshly paved surface and a lack of high frequency vibrations. Conversely, a vehicle traveling on a cobblestone road may have a high baseline setting (e.g., 5 out of 5) based on the roughness of the cobblestone road and the high frequency vibrations caused thereby.

In some examples, such as with autonomous vehicles, the computing device may determine whether there are occupants in the vehicle. In some examples, a determination may be based on input from one or more sensors in the vehicle. In various examples, the baseline setting and/or the perception based suspension system may be adjusted based on the determination. For example, a computing device of an autonomous vehicle may determine that there are no occupants in the vehicle, and may disengage the perception based suspension system. The disengagement of the perception based suspension system may provide more computing power to the computing device to process raw sensor data faster, and/or provide more data to the global map server. Additionally, or in the alternative, by disengaging the perception based suspension system, the vehicle may be able to conserve energy to increase the distance the vehicle may travel without refueling or recharging.

In various examples, the suspension systems on the vehicle may include one or more sensors, such as accelerometers, potentiometers, position sensors, and the like. The one or more sensors may provide feedback to the computing device related to the resultant effect of a deformation on the suspension system, such as an unanticipated movement of the wheel after adjusting a component to negate the effects of the deformation. The feedback input may include a location of the tire at the time of the unanticipated movement.

In some examples, the computing device may use the feedback to update algorithms related to adjustments for deformations. For example, a computing device of a vehicle may detect a pothole in a track of the vehicle, and may calculate adjustments to make to various component of the relevant suspension systems. The tire may then drive over the pothole, and the wheel may drop slightly (i.e., additional, unanticipated deflection or movement of the wheel). The suspension systems may provide feedback to the computing device regarding the movement of the wheel. The computing device may use the feedback input to adjust the algorithms to increase the stiffness of the suspension system the next time the vehicle encounters a similar situation.

Additionally, or alternatively, the computing device can send the feedback input to the global map server. The global map server may receive the data and update the height map based on the feedback. In various examples, the global map server may update the height map based on a determination that the additional movement (i.e., deflection) of a suspension system component has exceeded a threshold amount of movement. In some examples, the feedback may include unanticipated movement of the tire after adjusting components to negate the effects of a deformation. In such examples, the computing device and/or the global map server may determine that the deformation has changed in shape and/or size. Using the pothole example from above, the computing device and/or the global map server may determine, based on the movement of the wheel, that a depth of the pothole is greater than what is mapped on the global height map. The computing device and/or the global map server may calculate a new depth of the pothole based on the drop of the wheel. The global map server may update the global height map based on the new depth of the pothole. In some examples, such a discrepancy may also indicate that there is a malfunction with some of the sensors. As a non-limiting example, if various sensors (e.g. cameras, LIDAR, RADAR) determine a height which does not correspond to a sensed height (e.g. based on wheel deflection), the computer system may indicate that one or more of the sensors are malfunctioning.

The updated global height maps may provide an accurate map of the road surface to allow a perception based suspension system on a vehicle to quickly and effectively anticipate deformations and/or course deviations, and adjust components of the suspension systems to negate effects of the deformations and/or course deviations.

The systems, methods, and devices described hereinafter as making up the various elements of the present disclosure are intended to be illustrative and not restrictive. Many suitable systems, methods, and configurations that would perform the same or a similar function as the systems described herein, are intended to be included within the scope of the disclosure. Example implementations are provided below with reference to the following figures.

FIG. 1 illustrates an example environment 100 in which a vehicle 102 with a perception based motion and suspension control system may operate. In various examples, the vehicle 102 may include a primary direction of travel (i.e., forward) and a secondary direction of travel (i.e., reverse). In some examples, the vehicle 102 may be configured to travel, with the same or substantially similar performance, in two directions (i.e., forward and reverse).

The vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to stop, including all parking functions, it may be unoccupied. This is merely an example, and the systems and methods described herein may be incorporated into any ground-borne vehicle, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

The example vehicle 102 shown in FIG. 1 is an automobile having a body (e.g., a body, a frame, or a combination thereof), four wheels and respective tires and suspension systems for each of the wheels. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels comprising two tracks 104, a left track 104(1) and a right track 104(2), the systems and methods described herein may be incorporated into vehicles having fewer or a greater number of wheels, tires, and/or tracks 104.

The vehicle 102 may include a perception-based suspension control module 106 that is configured to receive a global height map from a global map server. The global height map may represent one or more deformations 108 on a surface of the road in the environment 100. The deformations 108 may include deviations to a substantially flat surface of the road. The deviations may include raised sections (e.g., speed bumps, lane markers, etc.) and/or depressions (e.g., dip in the road, pothole, etc.). Additionally, the global height map may represent one or more boundaries 110 of the road surface. In the illustrative example, the boundaries 110 comprise curbs. In other examples, the boundary may comprise a median strip, a wall, and/or other structure representative of a road surface boundary. In various examples, the global height map may comprise, at the outer edges, the boundaries 110. In such examples, the global height map may be limited to height depictions (e.g., representations) of the road surface and boundaries thereof. In some examples, the global height map may extend beyond the boundaries 110, to include height depictions additional surfaces other than the road surface, such as a sidewalk, a shoulder, etc.

The vehicle 102 may receive the global height map by a computing device configured to process height map data. In various examples, the computing device may comprise, at least in part, a vehicle and/or suspension controller. The computing device may be configured to identify deformations 108 in the global height map. In various examples, the global height map data may include a classification (e.g., a type) of the deformations 108. In some examples, the computing device may be configured to determine a classification of the deformation 108 based on a shape, size, location, and/or other factors. The computing device may determine that one or more of the deformations 108 is situated on a track 104 (e.g., path of the tires) of the vehicle 102. The track 104 may be determined based on a trajectory and/or a course of the vehicle 102.

In the illustrative example, the computing device may evaluate the tracks 104 a distance D from the vehicle to identify deformations 108. The distance D of the track 104 may be determined based on a trajectory, course, and/or a speed of the vehicle 102. For example, a computing device may evaluate the tracks 104 of vehicle 102 traveling 30 miles per hour (MPH) out to a distance of 50 feet on the global height map to determine if a deformation exists relative to one of the tracks 104. For another example, the computing device may evaluate the tracks 104 a distance of 100 yards for a vehicle 102 traveling 60 MPH.

In various examples, the computing device may plot at least part of a course of the vehicle on the height map. The course may include a series of one or more planned trajectories of the vehicle and/or a path of each track 104(1) and 104(2) relative to the planned trajectories. The computing device may evaluate the height map relative to the tracks 104, and determine whether there is a deformation 108 in a track 104. For example, a vehicle may have a planned course to travel westbound in a right lane, with the tires equidistant from a centerline for 25 meters, and then merge into the left lane to establish itself on a westbound heading, centered in the left lane. The computing device may evaluate the tire tracks 104 relative to the three planned trajectories, and determine if any deformations 108 are present in the planned path.

In some examples, a pose (i.e. a position and orientation) of the vehicle 102 may be determined based at least in part on one or more of the sensors using various algorithms, such as, for example, Kalman filters, particle filters, bundle adjustment, or the like. Such a pose may correspond to a location within the global height map. By localizing the vehicle 102 within the global height map, height information about the environment relative to the vehicle 102 may be determined.

Additionally, or alternatively, the computing device may determine a current trajectory of the vehicle. In various examples, the computing device may use motion sensor data relative to known locations of the sensors with respect to the computing device, to determine the trajectory. In some examples, the computing device may also, or alternatively, use one or more navigation sensors (e.g., GPS, INS, etc.) to determine a current trajectory of the vehicle, such as a change in location of the vehicle over time. In some examples, the computing device may receive trajectory data from another computing source, such as an external teleoperator or an alternate on board computing system. The computing device may use the current trajectory of the vehicle to determine a path of the tire tracks 104 relative to the current trajectory.

In the illustrative example, the vehicle 102 has a northbound trajectory relative to a road. The computing device may determine that, relative to the current northbound trajectory, the right track 104(2) of the vehicle 102 will encounter a deformation 108(1). The computing device may determine that the deformation 108(1) is a depression. In some examples, the computing device may determine that the depression corresponds to a pothole. The computing device may evaluate the global height map, and determine the dimensions (i.e., height, width, depth) of the deformation 108(1).

The computing device may determine, based on the location and/or dimensions of the deformation 108, an amount of the tire track that will encounter the deformation 108. As illustrated in FIG. 1, 100% of the right track 104(2) (i.e., right tires) will encounter the deformation 108(1). In other examples, a smaller percentage of the track 104 may encounter the deformation 108. Based on the dimensions of the deformation 108 and/or a percentage of the track 104 that will encounter the deformation 108, the computing device may calculate one or more adjustments to make to one or more components of the suspension system to negate the effects of the deformation 108. A calculation may be based on one or more control algorithms related to determining a change to make to a component based on anticipated forces. In at least one example, the one or more control algorithms may include a Skyhook algorithm, based on the Skyhook theory. The one or more components may include active and/or semi-active suspension system components, such as shock absorbers (e.g., damper, spring, linear actuator, etc.), control arms, sway bars, torsion bars, and the like.

Additionally, the computing device may calculate a time in which the respective tires will encounter the deformation 108. The time may be based on a speed of the vehicle, a distance to the deformation 108 and/or the trajectory. Similar to the trajectory calculation, the computing device may calculate the speed and distance to the deformation based on input from one or more sensors on the vehicle 102.

The computing device may send a signal to the respective suspension systems to cause the one or more components to adjust for the deformation 108. The signal may include an adjustment to make to each relevant component, a time to implement the adjustment, and/or a length of time to maintain the adjustment. In some examples, the adjustment to the components of the front suspension system may be different than the adjustment to the components of the rear suspension system. In some examples, the adjustments to the front and rear suspension systems may be the same. Using the illustrative example in FIG. 1, the computing device of vehicle 102 determines the dimensions of the deformation 108(1) and that 100% of the track 104(2) that will encounter the deformation 108(1). The computing device may determine that the right front tire of the vehicle 102 will encounter the deformation 108(1) at a time t, and the right rear tire will encounter the deformation 108(1) at a time t+0.5 s. Accordingly, the computing device may send a signal including an instruction to tighten a rebound of a right front shock absorber and to add force to a sway bar, starting at time t. The computing device may send a signal to the right rear tire with similar instructions, to start at time t+0.5 s. The front and rear tires of the vehicle 102 may consequently glide over the deformation 108(1).

In various examples, the computing device may determine that an deformation 108 may, in whole or in part, be avoidable. In such examples, the deformation 108 may be avoidable if the vehicle 102 could maneuver to avoid the deformation 108 in whole or in part. For example, the computing device may determine that with a deviation in trajectory to the left, the track 104(2) may avoid the deformation 108(1). Based on a determination that the deformation 108 may be avoidable, the computing device can provide deformation avoidance data to a vehicle control system. The vehicle control system may thus adjust the course (e.g., series of trajectories) of the vehicle to avoid the deformation, and reestablish on an original course or a course substantially similar to the original course (e.g., same general direction, but with tracks of the vehicle 102 in different positions in the lane).

In various examples, the suspension system may include one or more feedback sensors. The feedback sensors may include accelerometers, gyroscopes, magnetometers IMUs, or other sensors configured to measure linear and/or angular motion. The feedback sensors may provide feedback input to the computing device at a high frequency (e.g., 200 Hz, 1 kHz, etc.). The feedback input may include unanticipated movement of the wheel upon encountering the deformation. In some examples, the feedback input may include a location of the tire at the time of the unanticipated movement.

In some examples, the computing device may use the feedback to update algorithms related to suspension system adjustments. For example, the right front tire of vehicle 102 may drive over the deformation 108(1), and the wheel may drop 0.5 cm more than anticipated. The feedback sensors may capture data related to the wheel drop, such as the 0.5 cm drop, and send it to the computing device. The computing device may use the feedback input to adjust the algorithms to increase the stiffness of the suspension system the next time the vehicle encounters a similar scenario. In some examples, feedback from a front suspension may be used to update control of the rear suspension before encountering the deformation 108 so as to provide a better reaction.

Additionally, or alternatively, the computing device may determine that the deformation 108 has a different shape and/or size than depicted in the global height map. In various examples, the computing device may compare real-time perception sensor data to the global height map. In some examples, the computing device may compile the real-time perception sensor data into a local height map. In such examples, the local height map may be compared to the global height map to determine differences in deformation shape and/or size. In some examples, the computing device can determine a change to the size and/or shape of the deformation based on feedback input from one or more of the feedback sensors. In such examples, the computing device may determine that the unanticipated movement corresponds to a change in size and/or shape of the deformation. The computing device may send the data (e.g. update data) associated with the deformation differences to the global map server. In some examples, the update data may be sent based on detection of a difference. In some examples, the update data may be sent based on the difference in size and/or shape exceeding a threshold amount. The global map server may receive the data, and update the global height map accordingly.

Figure 2:
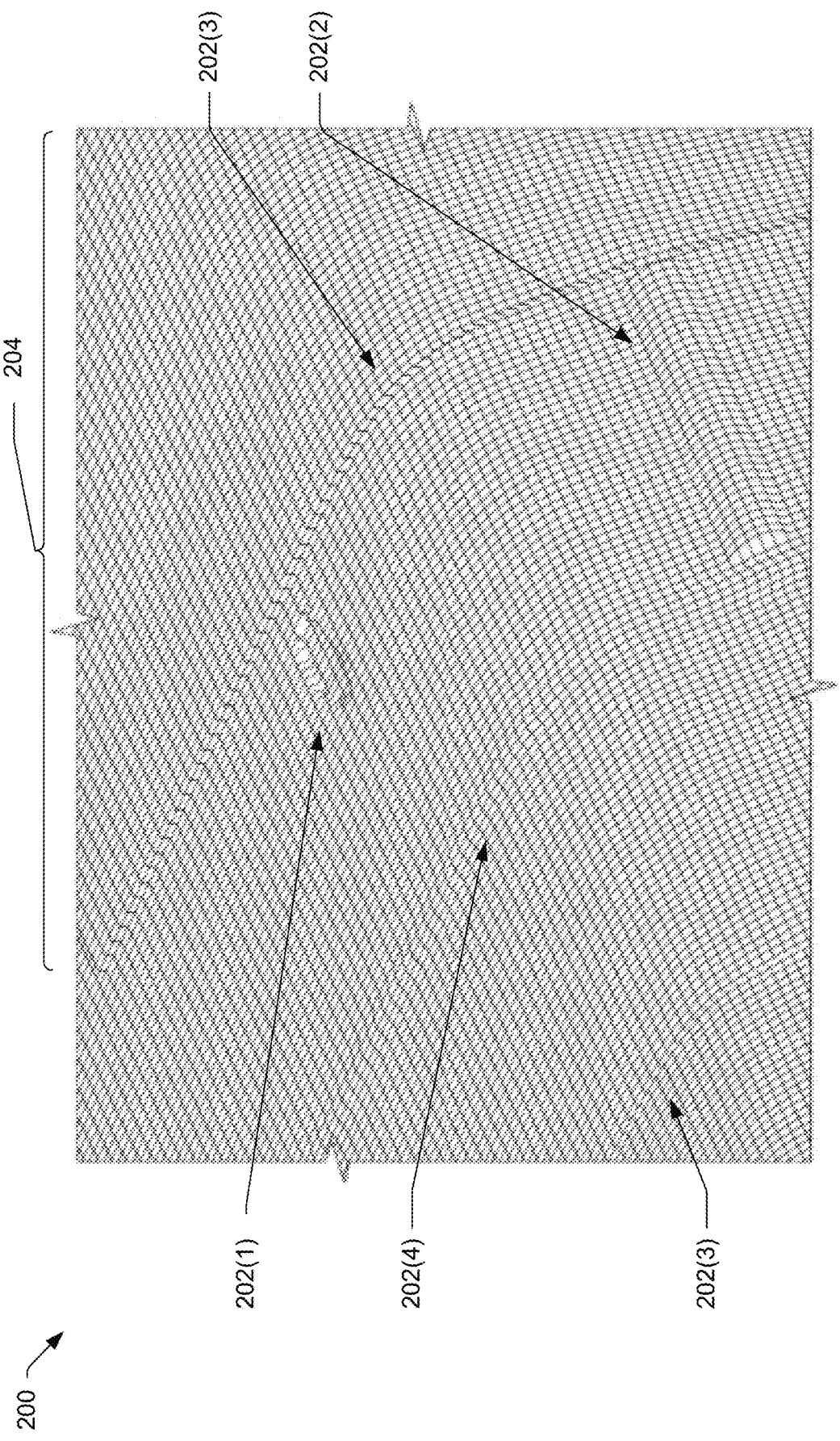
FIG. 2 is an example height map used in a perception based suspension control system.

FIG. 2 illustrates an example height map 200 used in a perception based motion and suspension control system. The height map 200 may be a local height map generated by a computing device of a vehicle, such as vehicle 102 or a global height map generated by a global map server based on local height map data and/or sensor data provided by the computing device of the vehicle. The height map 200 may comprise a high resolution (e.g., mm scale, such as 3 mm resolution) include a 2.5D or 3D representation of a road surface. In the illustrative example, the height map 200 depicts a road surface area in proximity to vehicle 102 in FIG. 1. The height map 200 may comprise a representation of points corresponding to the road surface, each of the points including a height. In the illustrative example, the points of the height map 200 comprise rectangles. In other examples, the points may comprise other shapes, such as triangles, circles, cylinders, and the like.

The height map 200 may be generated based on sensor data (e.g., perception and/or location sensor data) from one or more sensors of the vehicle. The computing device of the vehicle may know a location corresponding to each of the sensor(s). The computing device may use the locations of the sensors and sensor data to determine a trajectory of the vehicle. Additionally, or alternatively, the computing device may use one or more navigation sensors to determine a trajectory of the vehicle, such as a change in location of the vehicle over time. In various examples, the computing device may process the trajectory data, a known location and orientation of respective sensors, the respective sensor data to determine one or more points of a height map. The computing device may use stereo images, structure from motion, distances to objects, or a combination of the foregoing to determine the one or more. In at least one example, the one or more points may be determined using sensor fusion between laser data and camera data.

The computing device may then infer a representation of the point(s) to generate the height map 200. In some examples, the height map may include a 3D model the road surface. In other examples, the height map 200 may include a 2.5D model of the road surface. For example, a height map 200 may comprise a 2D image of the road surface, with each pixel of the image having a Z-height. In various examples, the height of each point (or pixel) may be relative to the road surface and/or to neighboring (e.g., adjacent) pixels. In such examples, a negative value height may correspond to a depression, and a positive value height may correspond to a raised section.

In some examples, the computing device may send the trajectory data of the vehicle with the raw sensor data from the sensor(s) to the global map server. In such examples, the global map server may process the data and generate the height map 200. In examples in which the height map 200 is a global height map, the global map server may process height map data associated with multiple computing devices of multiple vehicles to generate the global height map. In such examples, a resolution of a height estimation may be much finer than any one sensor, or sensors from a single vehicle, alone. As a non-limiting example, though a single sensor on a vehicle may have a resolution of tens of centimeters, by combining multiple sensors from multiple vehicles, a height resolution on the order or millimeters or centimeters may be established.

The height map 200 may include one or more deformations 202. The one or more deformations 202 may include depressions, such as deformation 202(1), and/or raised sections 202(2), 202(3), 202(4), and 202(5). In the illustrative example, the deformation 202(1) corresponds to deformation 108(1) from FIG. 1 (depression associated with a pothole), and deformation 202(2) corresponds to deformation 108(2) from FIG. 1 (raised section associated with a speed bump). In various examples, the deformations 202(3) may correspond to a curb, or other raised section denoting a boundary of a road surface, such as boundary 110. In the illustrative example, the height map 200 includes a section 204 beyond the road surface. In some examples, the computing device and/or the global map server may filter out data representative of the section 204. In such examples, the height map 200 may not include the section 204. The height map 200 may comprise a high-resolution map, depicting heights of deformations with millimeter level accuracy. As such, the height map 200 may include deformations that extend above and/or below a road surface. For example, the height map 200 may include deformation 202(4) depicting a lane marking, such as deformation 108(3) from FIG. 1.

In various examples, the computing device and/or the global map server may use machine learning techniques to identify the deformation(s) 202. Machine learning generally refers to a broad class of algorithms in which an output is generated based on learned parameters. An example machine learning algorithm which can be used to identify the deformation(s) 202 is a neural network (NN), such as a convolutional neural network (CNN). Other examples of machine learning algorithms may also be used.

In examples using machine learning, the computing device and/or the global map server may be trained to identify the deformation(s) 202. Additionally, the computing device and/or the global map server may be trained to assign a confidence level to the identification of the deformation. The computing device and/or the global map server may be trained using a dataset of a plurality of images representing real-world scenarios of known deformations on a road surface. In some examples, the images may be annotated by hand or via one or more algorithms to segment, detect, classify, label, and/or assign a confidence level to the deformation(s) 202 in the dataset.

As discussed in further detail below with regard to FIG. 6, the height map 200 may be used by the computing device of the vehicle to identify a deformation in a track, such as track 104 of the vehicle tires. The computing device may identify the deformation and may send a signal to one or more suspension systems of the vehicle to adjust one or more components to negate effects of the deformation, thereby optimizing ride comfort for occupants of the vehicle.

Figure 3:
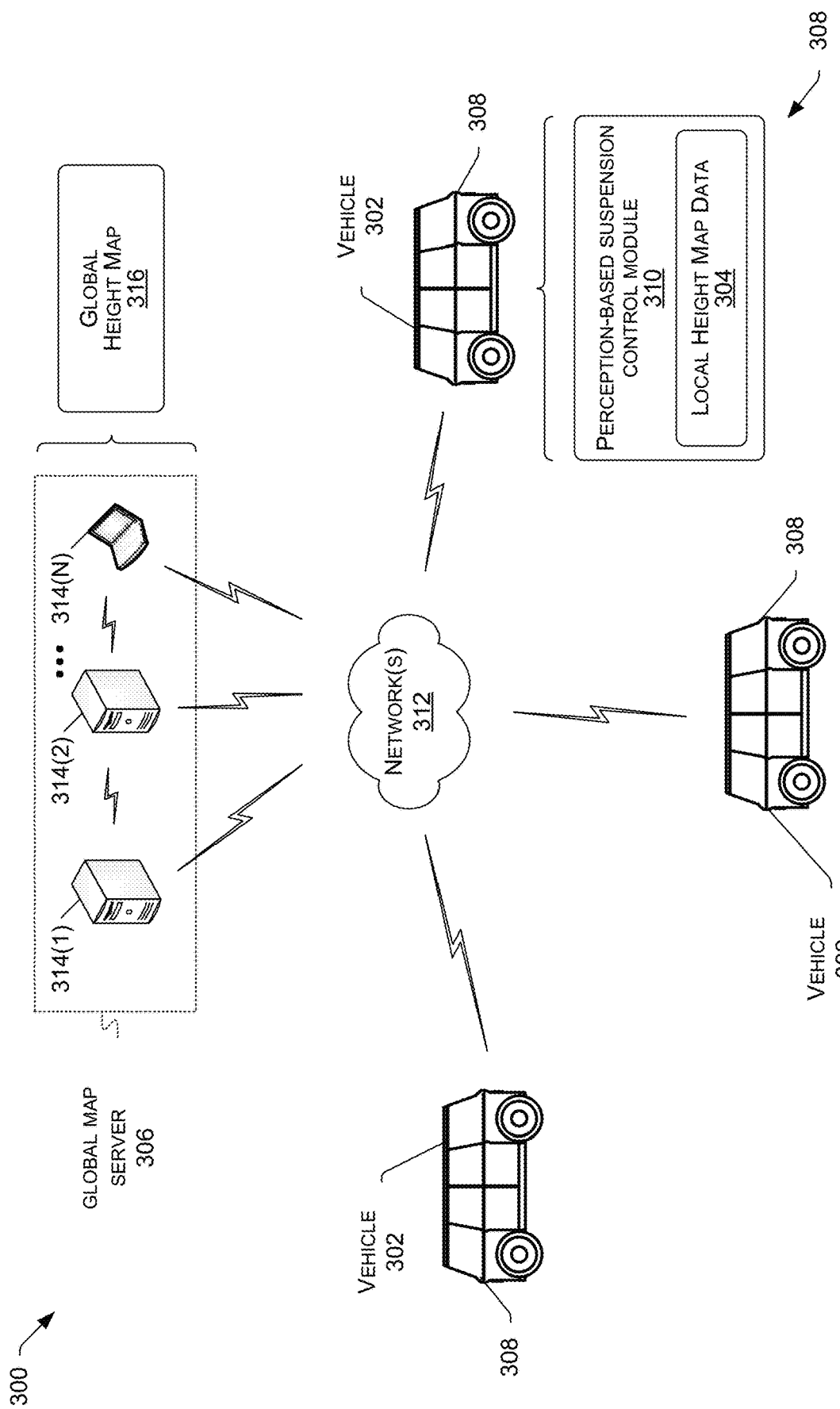
FIG. 3 is a schematic diagram of an example system to generate a global height map.

FIG. 3 is a schematic diagram of a system 300 to generate a global height map. For the purpose of illustration, the vehicles 302, such as vehicle 102, may comprise a fleet (e.g., a platoon) of multiple vehicles 302, each of which being configured to communicate the local height map data 304 to the global map server 306. The vehicles 302 may thus provide crowd sourced data to the global map server 306 for building and/or updating a global height map.

In various examples, the computing device 308 of the vehicle 302 may include a perception based suspension control module 310, such as perception based suspension control module 106. In such examples, the perception-based suspension control module 310 may be configured to combine sensor data (e.g., perception and location sensor data) data into local height map data 304. Additionally, the computing device 308 may be configured to send the local height map data 304 to the global map server 306 via a network 312.

The network(s) 312 can include public networks such as the Internet, private networks such as an institutional and/or personal intranet, or some combination of private and public networks. The network(s) 312 can also include any type of wired and/or wireless network, including but not limited to local area networks (LANs), wide area networks (WANs), near field communication (NFC), satellite networks, cable networks, Wi-Fi networks, WiMax networks, mobile communications networks (e.g., 3G, 4G, and so forth), or any combination thereof. The network(s) 312 can utilize communications protocols, including packet-based and/or datagram-based protocols such as internet protocol (IP), hypertext transfer protocol (HTTP), hypertext transfer protocol secure (HTTPS), transmission control protocol (TCP), user datagram protocol (UDP), or other types of protocols. Moreover, network(s) 312 can also include a number of devices that facilitate network communications and/or form a hardware basis for the networks, such as switches, routers, gateways, access points, firewalls, base stations, repeaters, backbone devices, and the like.

In some examples, the network(s) 312 can further include devices that enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

The global map server 306 may include global map server devices 314(1)-314(N). Embodiments support scenarios where global map server device(s) 314 may include one or more computing devices that operate in a cluster or other grouped configuration to share resources, balance load, increase performance, provide fail-over support or redundancy, or for other purposes. Global map server device(s) 314 may belong to a variety of categories or classes of devices such as traditional server-type devices, desktop computer-type devices, mobile devices, special purpose-type devices, and/or embedded-type devices. Thus, although illustrated as desktop and laptop computers global map server device(s) 314 can include a diverse variety of device types and are not limited to a particular type of device. Global map server device(s) 314 may represent, but are not limited to, desktop computers, server computers or blade servers such as web-servers, map-reduce servers, or other computation engines or network-attached storage units, personal computers, mobile computers, laptop computers, tablet computers, or any other sort of computing device.

The global map server 306 may be configured to receive and process local height map data 304 from the computing device(s) 308. In various examples, the computing device(s) 308 may send the local height map data 304 based on a determination that the local height map data differs from data corresponding to a global height map 316. In some examples, the computing device(s) 308 may send the local height map data 304 continuously or periodically (e.g., every 30 minutes, hourly, daily, etc.).

As discussed above, the local height map data 304 may include crowd sourced data from multiple computing devices 308. Local height map data 304 may include raw sensor data collected by one or sensors on the vehicles 302. Additionally, the local height map data 304 may comprise a location of the vehicle 302, a location of the respective sensor, a trajectory of the vehicle 302, a direction the respective sensor is facing relative to the vehicle 302, a timestamp associated with a collection, and the like. In various examples, the location of the vehicle may be determined by the computing device 308 based on input from one or more sensors corresponding to location and/or navigation system sensors on the vehicle, such as GPS sensors, SLAM based systems, INS sensors, cell phone tower triangulation system sensors, and/or motion sensors.

The global map server 306 may receive the local height map data 304, and may build the global height map 316, such as height map 200. The global height map 316 may represent a high resolution 2D or 3D map of road surfaces in the area corresponding to the global height map 316. The global map server 306 may build the global height map 316 by processing the local height map data 304 from one or more vehicles 302.

The global map server 306 may provide the global height map 316 to the vehicles 302 for use by the suspension control systems. In various examples, the global map server 306 may compress the global height map 316 prior to sending the global height map 316 via the network(s) 312. In such examples, the global map server may use lossy and/or lossless compression algorithms.

As discussed above, the local height map data 304 may include raw sensor data. In such examples, the global map server 306 may process pose and/or trajectory data and the received sensor input to determine one or more points. The global map server 306 may then build a representation of the point(s). For example, the global map server 306 may represent the points as a mesh, a height map, a point cloud, a signed distance function, or the like. Such a representation may also include information about measurement uncertainties and associate a confidence with each point. As a non-limiting example, consider a two-dimensional image wherein each pixel contains one or more of a height, a location, a number of measurements, an uncertainty, or a confidence level. Additionally, or in the alternative, such information may be provided in one or more additional images such that only height information from the global height map may be sent to a vehicle. In various examples, the global map server 306 may combine points associated with a specific location, such as data corresponding to the specific location from multiple vehicles or a plurality of data related to the specific location from a single vehicle. In such examples, the global map server 306 may validate and/or confirm the representation corresponding to the specific location. For example, three vehicles may drive past a point A, and may capture images and LIDAR data corresponding to the point A. The global map server 306 may combine the data corresponding to point A from the three vehicles, may determine a pixel height associated with point A, and may assign the pixel height to point A with a high degree of confidence (e.g., validation of the height).

In various examples, the local height map data 304 may comprise a height map, such as height map 200. In such examples, the height map may be built by the computing device 308 of the vehicle 302, and send to the global map server 306. The computing device 308 may calculate and/or receive (e.g. from another device or teleoperator) a trajectory of the vehicle. In some examples, the trajectory may be calculated based on input from one or more motion sensors, and a known location and orientation of each sensor on the vehicle (e.g., respective to the computing device 308). Additionally, or alternatively, the trajectory may be calculated using navigation system sensor input, such as a GPS location and/or output of a SLAM system. The computing device 308 may of process the trajectory data, known location, known orientation, and the perception sensor data to determine one or more points of the height map. For example, a LIDAR sensor located at a front right corner of the vehicle may send a laser having an azimuth and elevation angle of 45° and 45°, respectively, relative to the vehicle. The LIDAR sensor may receive a reading at 7.8 meters from the LIDAR sensor. The computing device 308 may then determine that a point exits approximately 5.5 meters horizontally and vertically from the LIDAR sensor. The computing device 308 may use a known location of the LIDAR sensor to determine a distance of the point relative to a point on the vehicle, for mapping purposes. In various examples, the computing device may infer a representation of the points to generate the height map, and may send the height map to the global map server 306 as local height map data 304. Additionally, or in the alternative, the computing device 308 may infer distance using multiple sensor modalities (e.g. depth cameras, stereo cameras, etc.) such that the resulting estimate has a lower uncertainty than any one sensor alone. In such an example, the computing device 308 may also transmit an uncertainty estimate for every point in the height map.

The global map server 306 may map local height map data 304 from respective vehicles based on locations associated therewith. When building the global height map 316, the global map server 306 may associate points corresponding to a particular location with one another, and may determine a final representation of the points (e.g., accurate height associated with the location). In various examples, the global map server 306 may compare the points corresponding to the particular location. In such examples, the final representation may be based on a threshold number of points having the same representation (e.g., 5 points have the same or a substantially similar height), a threshold percentage of points having the same representation (e.g., 5 out of 10 points have the same or a substantially similar height), or the like. Additionally, or in the alternative, the global map server 306 may incorporate uncertainty information when creating the final representation and include such uncertainty measurements into such a final representation.

In some examples, the final representation may be based on a particular vehicle 302 from which the point is received. In such examples, the particular vehicle 302 associated with the local height map data 304 may be recognized by the global map server 306 as a trusted source for accurate data. In some examples, the particular vehicle 302 may include a designated mapping vehicle configured with high resolution sensors. For example, data from a vehicle known to have higher resolution cameras may be selected over a data from a vehicle with lower resolution cameras.

After determining the final representations, the global map server 306 may combine the final representations into an accurate, high resolution global height map 316. The global map server 306 may update the global height map 316 based on local height map data 304 received after the global height map 316 is built. The global map server 306 may receive local height map data 304 from multiple vehicles 302, and may compare the points of the global map server 306 to corresponding points of the local height map data 304 (e.g., points at the same location).

In various examples, the global map server 306 may determine that representations of the points on the local height map data 304 and the global map server 306 are the same. In such examples, the global map server 306 may determine to maintain the final representation of the point. In some examples, based on a determination to maintain the final representation, the global map server 306 may validate and/or assign a high confidence to the final representation in an updated global height map 316.

In various examples, the global map server 306 may determine that representations of the points on the local height map data 304 and the global height map 316 are different. The difference may be in location, height, or other factor related to the representation of the point. In some examples, responsive to determining a difference between the local height map data 304 and the global height map 316, the global map server 306 may replace the final representation with a new representation on an updated global height map 316. For example, the global map server 306 may receive an indication that a height corresponding to a point in the local height map data 304 is larger than the height in the final representation. The global map server 306 may generate an updated global height map 316 with the larger height.

In some examples, the global map server 306 will first validate (e.g., confirm) a new representation prior to updating the global height map 316. The validation may be based on a confidence level of the new representation provided by the source, a number of vehicles providing a same or substantially similar new representation, a particular vehicle from which the new representation is received, a quality of the sensors from which the new representation is derived, a resolution and/or clarity of the new representation, or the like.

In various examples, the global map server 306 may send the updated global height map 316 to the vehicles 302 based on an update to one or more points. In some examples, the global map server 306 may send the updated global height map 316 periodically (e.g., daily, weekly, etc.). In some examples, the periodicity may be based on an area corresponding to the global height map 316 and/or a time of year. For example, a global height map 316 representing a residential area in San Diego may be updated on a bi-weekly basis, whereas a global height map 316 representing a downtown section of Denver may be updated daily during the winter due to the propensity to develop potholes.

Figure 4:
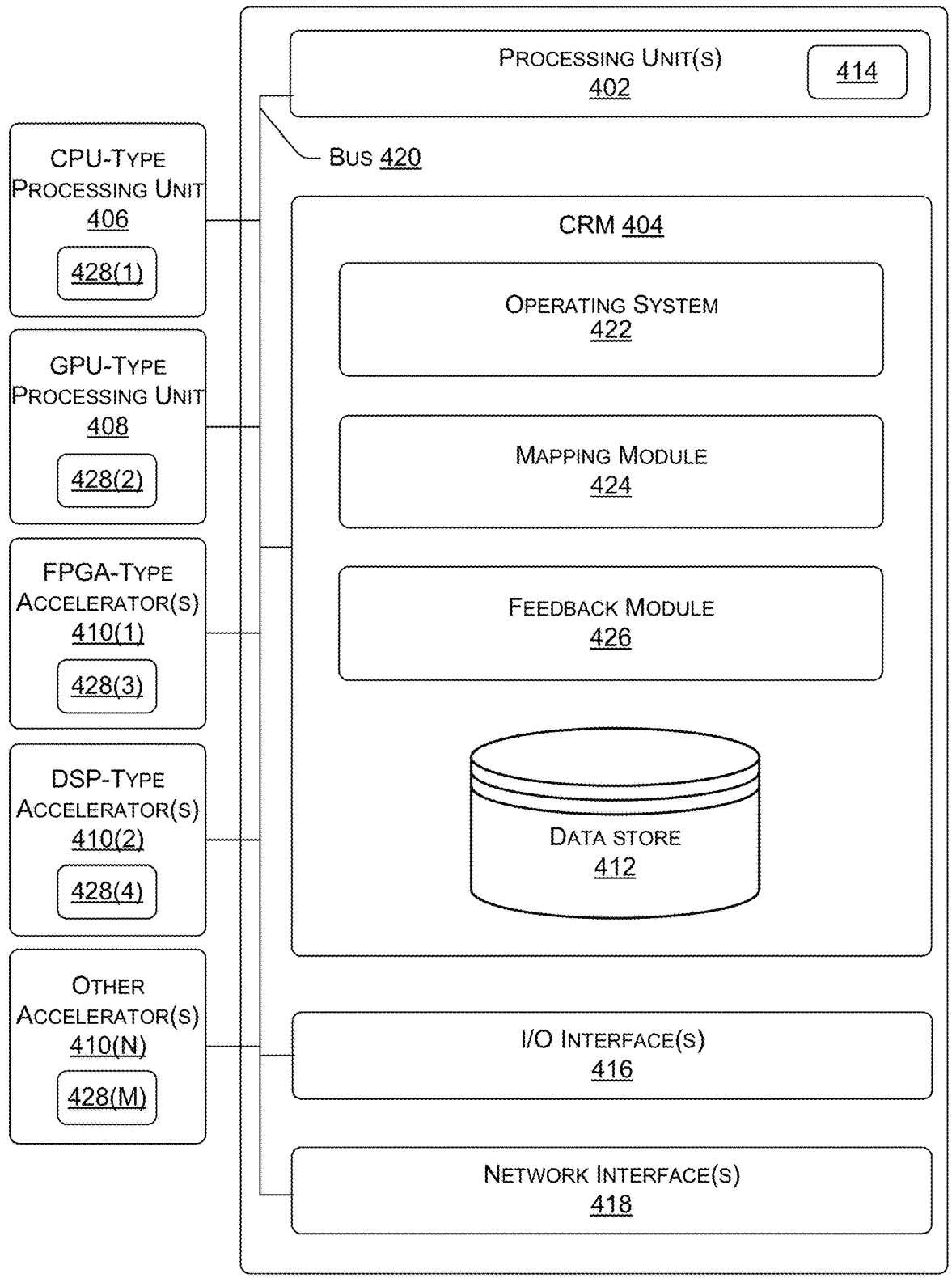
FIG. 4 is a block diagram that illustrates select components of an example global map server used to generate a global height map.

FIG. 4 illustrates an example global map server device 400 configured to generate and/or update a global height map, such as global map server device 314 from FIG. 3. In global map server device 400, processing unit(s) 402 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In some examples, global map server device 400 can be one of a plurality of devices, such as global map server devices 314(1), 314(2), and 314(N), which are part of a distributed service platform (e.g. the Cloud). In some examples, global map server device 400 can be one of a plurality of devices which are capable of connection via a proximity network. In various examples, global map server device 400 can be one of a plurality of devices which are both part of a distributed service platform and capable of connection via a proximity network.

In some examples, CRM 404 may store instructions executable by the processing unit(s) 402, which as discussed above, can represent a processing unit incorporated in global map server device 400. CRM 404 can also store instructions executable by external processing units such as by an external CPU-type processing unit 406, an external GPU-type processing unit 408, and/or executable by an external accelerator 410, such as an FPGA-type accelerator 410(1), a DSP-type accelerator 410(2), or any other accelerator 410(N). In various examples, at least one CPU-type processing unit 406, GPU-type processing unit 408, and/or accelerator 410 is incorporated in global map server device 400, while in some examples one or more of a CPU-type processing unit 406, GPU-type processing unit 408, and/or accelerator 410 is external to global map server device 400.

In the illustrated example, CRM 404 also includes a data store 412. In some examples, data store 412 includes data storage such as a database, data warehouse, or other type of structured or unstructured data storage. In some examples, data store 412 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Data store 412 can store data for the operations of processes, applications, components, and/or modules stored in CRM 404 and/or executed by processing unit(s) 402. Alternately, some or all of the above-referenced data and/or instructions can be stored on separate memories 414 on board one or more processing unit(s) 402, CPU-type processing unit 406, GPU-type processing unit 408 and/or accelerator(s) 410. For example, the data store 412 may store sensor data, such as in local height maps and/or global height maps.

Global map server device 400 can further include one or more input/output (I/O) interfaces 416 to allow global map server device 400 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). In addition, in global map server device 400, network interface(s) 418 can represent, for example, network interface controllers (NICs) or other types of transceiver devices to send and receive communications over a network, such as network 312.

In the illustrated example, global map server device 400 can operably connect the processing unit(s) 402 to CRM 404, I/O interface(s) 416, and network interface(s) 418 via a bus 420. In some examples, bus 420 can include one or more of a system bus, a data bus, an address bus, a PCI bus, a Mini-PCI bus, and any variety of local, peripheral, and/or independent buses.

In the illustrated example, CRM 404 also includes an operating system 422, which can be any type of operating system, such as MICROSOFT WINDOWS, WINDOWS, QNX™, IBM z/OS™, LINUX, ANDROID, iOS™, OS X™, NETBSD™, or any other operating system capable of managing computer hardware and software resources on global map server device 400.

CRM 404 also includes a mapping module 424 and a feedback module 426. Functionality described associated with the mapping module 424 and the feedback module 426 may be combined into one module or may be split and performed by a larger number of modules and/or APIs. In various examples, the feedback module 426 may be configured to receive sensor data (e.g., real-time data) from one or more computing devices, such as computing device 308. In various examples, the sensor data may be data collected by one or more sensors of a vehicle, such as vehicle 102, 302. In some examples, the sensor data may be data collected by one or more stationary sensors in an environment of the vehicle, coupled to the global map server via a wired and/or wireless signal. In such examples, the one or more stationary sensors may be sensors mounted in the environment and configured to monitor road conditions. The sensor data may include raw sensor data, local height map data, or a combination thereof.

The mapping module 424 may receive sensor data, and may generate (e.g., build) a global height map. The mapping module 424 may also receive relevant location data, such as a location of the sensor, and/or a location and/or trajectory of a vehicle. The location data may include input from one or more of a GPS sensor, an INS sensor, cellular tower triangulation, an accelerometer, a gyroscope, an IMU sensor, a motion sensor, a SLAM based system which uses various sensor modalities as input, etc. In some examples, the global height map may be generated using crowd sourced sensor data from multiple vehicles and/or stationary sensors. The global height map may include an accurate, high resolution 2.5 or 3D depiction of a road surface. In various examples, the mapping module 424 may be configured to filter out data corresponding to surfaces other than the road surface. In such examples, the mapping module 424 may filter out the road surface for the global height map. In some examples, the mapping module 424 may include data corresponding to curbs, medians, or other surfaces outside a boundary of the road surface.

In various examples, the mapping module 424 may receive multiple local height maps from multiple sources, each local height map corresponding to an area. In such examples, the mapping module 424 may combine the multiple local height maps together based on the area, to build the global height map. A combination of the multiple local height maps may include joining adjacent and overlapping local height maps together in a large mesh representation of points, based on the areas associated with each local height map.

Additionally, or alternatively, the mapping module 424 may receive raw sensor data, such as images from cameras and/or distance information to deformations, a timestamp of the raw sensor data, a source trajectory, and the pose of the source and/or sensors associated therewith. The raw sensor data may include location data corresponding to an area from which the data was captured. The mapping module 424 may then process the received information to determine one or more points of a height map, and infer a representation of the point(s) to generate the global height map.

In various examples, the mapping module 424 may be configured to compare data from multiple different sources, to validate (i.e., verify) the accuracy of the data. A validation may be based on a confidence level of the data provided by the source, a source known to provide highly accurate data (e.g., stationary sensors, high resolution cameras, etc.), aberrant data (e.g., data from one source different from that provided by multiple other sources), and the like. In some examples, the mapping module 424 may filter out data that is not validated. For example, data received from six different vehicles may include a deformation with the same dimensions at a same location, and data from a seventh vehicle may include the deformation at the location, but may depict the deformation as having different dimensions (e.g., blurred image makes it look larger). The mapping module 424 may filter the data from the seventh vehicle, and not include that data in the global height map.

In some examples, the mapping module 424 may identify one or more deformations in the sensor data. The deformation(s) may include depressions and/or raised sections in the road surface. The mapping module 424 may determine the dimensions of the deformation(s), and incorporate the data into the global height map accordingly. In various examples, the mapping module 424 may assign a classification to the deformation(s). In such examples, the mapping module 424 may include the classification in the global height map data.

In various examples, the mapping module 424 may use machine learning techniques to identify and/or classify the deformation(s). In examples using machine learning, the computing device and/or the global map server may be trained to identify and/or classify the deformation(s). Additionally, the computing device and/or the global map server may be trained to assign a confidence level to the identification of the deformation. The computing device and/or the global map server may be trained using a dataset of a plurality of images and/or distance data (e.g. from a LIDAR sensor) representing real-world scenarios of known deformations on a road surface. In some examples, the images may be annotated by hand or via one or more algorithms to segment, detect, classify, label, and/or assign a confidence level to the deformation(s) in the dataset.

After an initial build of the global height map, the mapping module 424 may be configured to update based on real-time sensor data (e.g., data recently captured by perception and/or location sensors). In various examples, the mapping module 424 may receive sensor data from a vehicle corresponding to a particular area. The mapping module 424 may compare the sensor data of the particular area to the depiction of the particular area on the global height map. In examples in which the sensor data is a local height map, the mapping module 424 may directly compare the local height map to the relevant area on the global height map. In examples in which the sensor data is raw sensor data, the mapping module 424 may first build a local height map of the data, and then compare the local height map to the relevant area on the global height map. The mapping module 424 may compare deformations in the local height map to those on the global height map in the same locations, and may determine if differences exist between the two height maps. The differences may include a new deformation (e.g., new pothole), a removed deformation (e.g., filled in pothole), changes to the shape and/or size of deformations (e.g., bigger pothole), and the like.

In various examples, the mapping module 424 may update the global height map based on an input from a computing device of a vehicle. In such examples, the computing device may process data from sensors on the vehicle, and may determine that a difference exists between the global height map and real-time conditions. In some examples, the computing device may determine the difference exists by comparing perception sensor data to the relevant location on the global height map. In such examples, the computing device may send information about the difference and/or an instruction to update the global height map based on a recognized difference.

In some examples, the computing device may determine the difference exists based on feedback from one or more sensors on the suspension system. The suspension system sensor(s) may include accelerometers, potentiometers, and the like. The suspension system sensor(s) may be configured to provide feedback to the computing device related to the resultant effect of a deformation on the suspension system, such as an unanticipated movement of the wheel. The feedback input may include a location of the tire at the time of the processed feedback. In various examples, the feedback module 426 may receive feedback input from the suspension system sensors indicating that an unanticipated movement in the suspension system occurred (e.g., an unanticipated force was applied to the suspension system via the tire). In some examples, the feedback module 426 may provide that information to the mapping module 424 to update the global height map accordingly. In some examples, the feedback module 426 may be configured to update the global height map.

In various examples, the feedback module 426 may process the feedback input, and determine if the additional and/or unanticipated movement exceeds a threshold amount of movement. In some examples, the feedback input may include unanticipated movement of the wheel from encountering a new deformation, or a newly removed or remedied deformation. In some examples, the feedback input may include unanticipated movement of the tire after adjusting components to negate the effects of a deformation. In such examples, the feedback module 426 may determine that the deformation has changed in shape and/or size. The threshold amount may correspond to a threshold change in shape and/or size of a deformation, and/or a threshold size and/or shape of a new or a removed deformation. Based on the threshold exceedance, the feedback module 426 may cause the global height map to be updated. In some examples, the feedback module 426 may indicate that there is a malfunction and/or a calibration error in one or more sensors.

Additionally, some or all of the above-referenced data can be stored on separate memories 428, such as memory 428(1) on board a CPU-type processing unit 406, memory 428(2) on board a GPU-type processing unit 408, memory 428(3) on board an FPGA-type accelerator 410(1), memory 428(4) on board a DSP-type accelerator 410(2), and or memory 428 (M) on board another accelerator 410(N).

Figure 5:
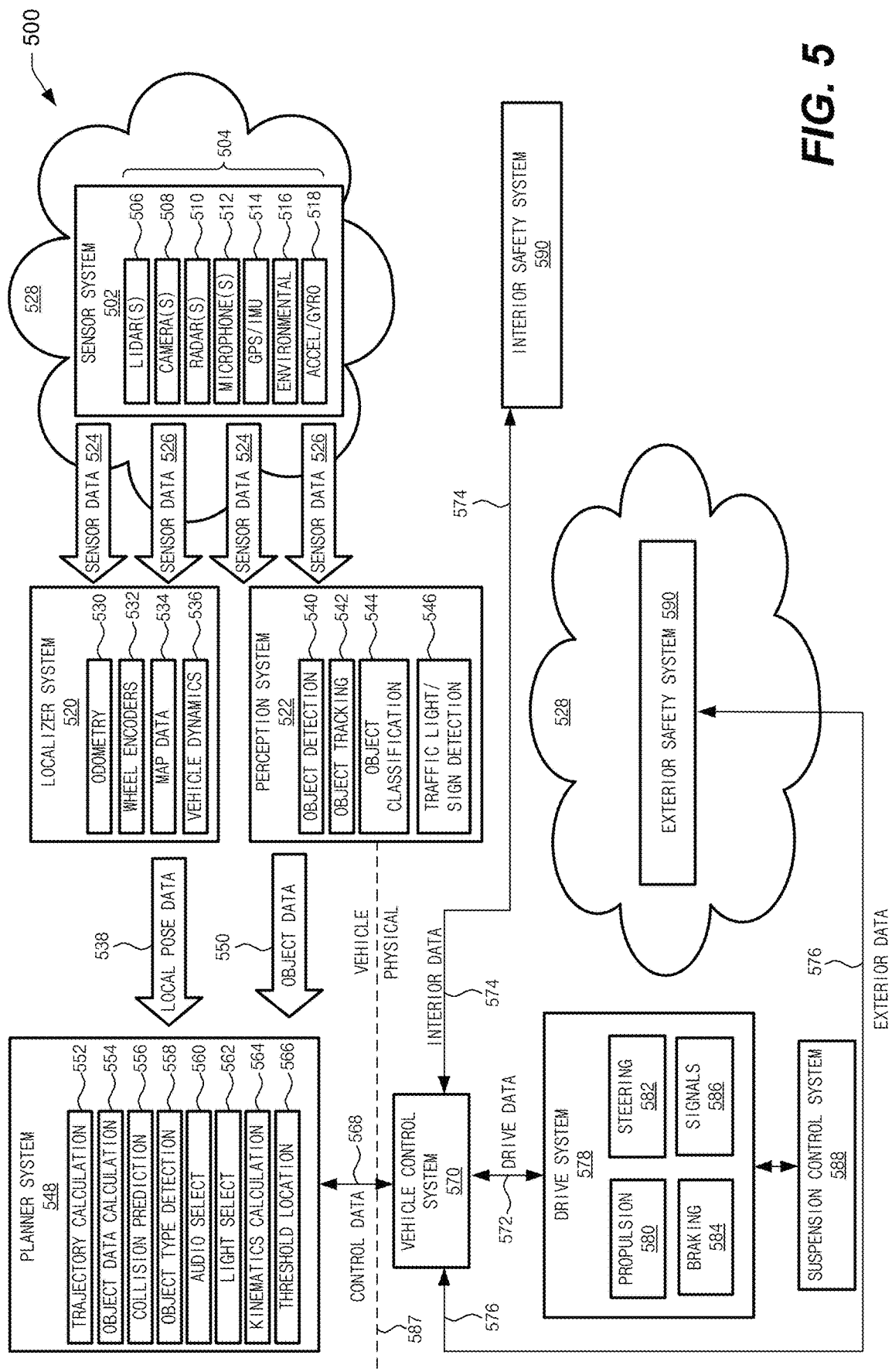
FIG. 5 is a block diagram of an example operation control system for controlling a vehicle.

FIG. 5 illustrates example components of an operation control system 500 configured to control operations of a vehicle. In various examples, the operation control system 500 may be implemented using a uniprocessor system including one processor, or a multiprocessor system including several processors (e.g., two, four, eight, or another suitable number). The processor(s) may be any suitable processor capable of executing instructions. For example, in various examples, the processor(s) may be general-purpose or embedded processors implementing any of a variety of instruction set architectures (ISAs), such as the x86, Performance Optimization With Enhanced RISC-Performance Computing (PowerPC), Scalable Processor Architecture (SPARC), or Microprocessor without Interlocked Pipeline Stages (MIPS) instruction set architecture (ISA)s, or any other suitable ISA. In multiprocessor systems, each processor may commonly, but not necessarily, implement the same ISA.

The operation control system 500 may include a non-transitory computer readable media configured to store executable instructions/modules, data, and/or data items accessible by the processor(s). In various examples, the non-transitory computer readable media may be implemented using any suitable memory technology, such as static random access memory (SRAM), synchronous dynamic random access memory (SDRAM), nonvolatile/Flash-type memory, or any other type of memory. In the illustrated example, program instructions and data implementing desired functions, such as those described above, are shown stored within the non-transitory computer readable memory. In other examples, program instructions, and/or data may be received, sent or stored on different types of computer-accessible media, such as non-transitory media, or on similar media separate from the non-transitory computer readable media. Generally speaking, a non-transitory, computer readable memory may include storage media or memory media, such as flash memory (e.g., solid-state memory), magnetic or optical media (e.g., a disk) coupled to the operation control system 500 via an input/output (I/O) interface. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface.

In various examples, the I/O interface may be configured to coordinate I/O traffic between the processor(s), the non-transitory computer readable media, and any peripheral devices, the network interface or other peripheral interfaces, such as input/output devices. In some examples, the I/O interface may perform any necessary protocol, timing or other data transformations to convert data signals from one component (e.g., the non-transitory computer readable media) into a format suitable for use by another component (e.g., processor(s)). In some examples, the I/O interface may include support for devices attached through various types of peripheral buses, such as a variant of the Peripheral Component Interconnect (PCI) bus standard or the Universal Serial Bus (USB) standard, for example. In some examples, the function of the I/O interface may be split into two or more separate components, such as a north bridge and a south bridge, for example. Also, in some examples, some or all of the functionality of the I/O interface, such as an interface to the non-transitory computer readable media, may be incorporated directly into the processor(s).

In the example shown in FIG. 5, the operation control system 500 includes a sensor system 502 including a plurality of sensors 504. The sensors 504 may include, for example, LIDAR 506, image capture sensors 508 (e.g., cameras or other imagers), RADAR 510, sound capture sensors 512 (e.g., microphones), global positioning system (GPS) sensors and/or inertial measurement unit sensors (IMU) 514. The sensor system 502 may also include one or more environmental sensors 516, such as, for example, one or more sensors for detecting ambient temperature, temperature of the road surface, humidity, and barometric pressure. The sensor system 502 may also include an accelerometer/gyroscope 518 to measure the orientation and/or acceleration of the vehicle, such as vehicle 102. As discussed below, this can be used to maneuver the vehicle at, or below, the maximum acceleration rate for the cargo.

The operation control system 500 may also include a localizer system 520 and a perception system 522 that may receive location and environment sensor data 524 and/or object sensor data 526, respectively, from one or more of the sensors 504 of the sensor system 502. For example, the localizer system 520 may receive location and environment sensor data 524 associated with the location of the vehicle in the environment 528, such as from GPS/IMU 518. In some examples, the localizer system 520 may use sensor data to localize the vehicle on a global height map. The perception system 522 may receive object sensor data 526 relevant to determining information associated with objects in the environment 528 surrounding the vehicle, such as sensor data from LIDAR 506, image capture sensors 508, RADAR 510, environmental sensors 516, and/or sound capture sensors 512. In some examples, the localizer system 520 may receive data from sources other than the sensor system 502, such as, for example, map data, map tile data, route data, route network definition file (RNDF) data, a data store, and/or a data repository. In some examples, the location and environment sensor data 524 received by the localizer system 520 may be identical (or at least similar to) to the object sensor data 526 received by the perception system 522. In some examples, the sensor data 524, 526 received by the localizer system 520 may not be identical to the sensor data 524, 526 received by the perception system 522. The sensor data 524, 526 may each include data from any combination of one or more sensors or sensor types in the sensor system 502. The amounts and types of sensor data 524, 526 may be independent from one another and/or may be similar or equivalent.

The localizer system 520 may receive and/or access data from sources other than sensor data 524, 526, such as, for example, odometer data 530 from motion sensors configured to estimate a change in position of the vehicle over time, wheel encoders 532 configured to calculate motion, distance, and other metrics associated with the vehicle based on the rotations of one or more of the wheels, map data 534 from data representing map tiles, route data, RNDF data, and/or other data, and data representing the model and/or type of vehicle corresponding to the vehicle, which may be used to calculate vehicle location data based on vehicle dynamics modeling 536 (e.g., from simulations, captured data, etc.) of the vehicle. The localizer system 520 may use one or more of the data resources indicated herein to generate data representing local position and orientation data (e.g., local pose data 538).

In some examples, the perception system 522 may analyze, process, and/or manipulate sensor data 524, 526 to implement object detection 540 and/or an object tracking 542. This can include differentiating between objects that are static and objects that are in motion. The object tracking 542 may also track one or more moving objects based on the movement of the object in the environment 528. This may also include an object classification 544 to identify the object type—e.g., car, motorcycle, cyclist, pedestrian, empty box, trash, etc. The perception system 522 may also include a traffic light/sign detection 546 strategy (e.g., identifying traffic lights, stop signs, railroad crossings, lane markers, and pedestrian crosswalks).

In the example shown, the operation control system 500 also includes a planner system 548 configured to receive the local pose data 538 and object data 550, and analyze the local pose data 538 and the object data 550 to implement functions including, for example, a trajectory calculation 552, an object data calculation 554, a collision prediction 556, an object type detection 558, an audio signal selection 560, a light pattern selection 562, a kinematics calculation 564, and a threshold location estimation 566. The example planner system 548 may communicate trajectory and control data 568 to a vehicle control system 570. The vehicle control system 570 may be configured to process the control data 568 to generate drive system data 572, interior safety system data 574, exterior safety system data 576. The drive system data 572 may be communicated to a drive system 578, and the drive system 578 may be configured to communicate the drive system data 572 to a propulsion system 580, a steering system 582, a braking system 584, and a signal system 586 (e.g., turn signals, brake signals, headlights, and/or running lights). For example, the drive system data 572 may include propulsion data (e.g., a voltage, current, or power signal for electric motors, and/or a throttle signal for internal combustion engines) for the propulsion system 580, steering angle data for the steering system 582 (e.g., a steering angle setting), and braking data for the braking system 584 (e.g., a deceleration rate to be achieved).

In various examples, the drive system 578 may be operably coupled to a suspension control system 588. In some examples, the drive data 572 may be communicated, in whole or in part, to the suspension control system 588. In such examples, the suspension control system 588 may calculate one or more adjustments to make to one or more components of the suspension system based on the drive data 572. In some examples, the suspension control system may identify a deformation in a path of the vehicle, and may determine that the deformation is avoidable. In such examples, the suspension control system 588 may send one or more signals to one or more systems of the drive system 578, such as the steering system 582, to maneuver to avoid the deformation. Maneuvering instructions may include secondary instructions to establish the vehicle on an original or substantially original course.

In the example shown in FIG. 5, a dashed line 587 may represent a demarcation between a vehicle trajectory processing layer and a vehicle physical execution layer, where data processed in the vehicle trajectory processing layer is implemented by one or more of the drive system 578, an interior safety system 590, an exterior safety system 592 and/or the suspension control system 588. For example, one or more portions of the interior safety system 590 may be configured to enhance the safety of occupants of the vehicle in the event of a collision and/or other event, such as an abrupt collision avoidance maneuver by the vehicle. In some examples, one or more portions of the exterior safety system 592 may be configured to reduce impact force or other adverse effects of a collision.

In various examples, the parameter values and other data illustrated herein may be included in one or more data stores, and may be combined with other information not described or may be partitioned differently into more, fewer, or different data structures. In some examples, data stores may be physically located in one memory or may be distributed among two or more memories.

Those skilled in the art will appreciate that the operation control system 500 is merely illustrative and is not intended to limit the scope of the present disclosure. In particular, the computing device and devices may include any combination of hardware or software that can perform the indicated functions, including computers, network devices, internet appliances, tablet computers, PDAs, wireless phones, pagers, etc. The operation control system 500 may also be connected to other devices that are not illustrated, or instead may operate as a stand-alone system. In addition, the functionality provided by the illustrated components may in some examples be combined in fewer components or distributed in additional components. Similarly, in some examples, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other examples, some or all of the software components may execute in memory on another device, such as computing device 308 from FIG. 3, and communicate with the illustrated operation control system 500. Some or all of the system components or data structures may also be stored (e.g., as instructions or structured data) on a non-transitory, computer-accessible medium or a portable article to be read by an appropriate drive, various examples of which are described above. In some examples, instructions stored on a computer-accessible medium separate from the operation control system 500 may be transmitted to the operation control system 500 via transmission media or signals such as electrical, electromagnetic, or digital signals, conveyed via a communication medium such as a wireless link. Various examples may further include receiving, sending or storing instructions and/or data implemented in accordance with the foregoing description on a computer-accessible medium. Accordingly, the techniques described herein may be practiced with other control system configurations. Additional information about the operations of the suspension control system 588 of the vehicle is discussed below.

Figure 6:
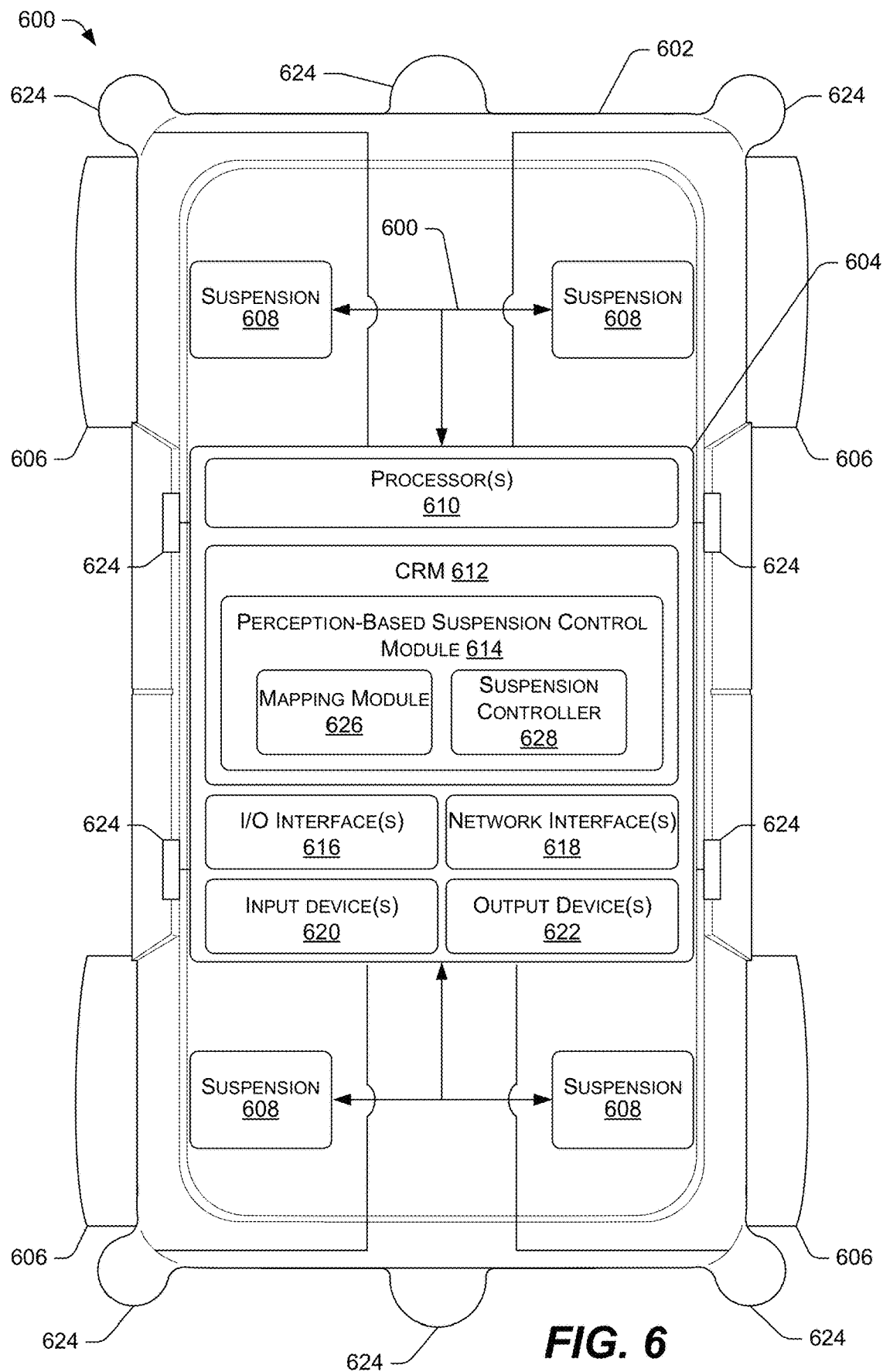
FIG. 6 is a block diagram that illustrates select components of an example perception based vehicle suspension control system.

FIG. 6 is a block diagram that illustrates select components of a suspension control system 600 of a vehicle 602, such as suspension control system 588. The suspension control system 600 may include a computing device 604, such as computing device 308, and multiple wheels 606 with respective suspensions 608.

The computing device 604 may comprise all or a part of a computing device utilized in the operation and/or control of a vehicle, such as operation control system 500. The computing device 604 may include one or more processors 610 operably connected to a non-transitory computer-readable media (CRM) 612, such as via a bus, which in some instances can include one or more of a system bus, a data bus, an address bus, a PCI bus, a Mini-PCI bus, and any variety of local, peripheral, and/or independent buses.

CRM 612 may be configured to store executable instructions/modules, data, and/or data items accessible by the processor(s) 610. In various examples, the non-transitory CRM 612 may be implemented using any suitable memory technology, such as static random access memory (SRAM), synchronous dynamic random access memory (SDRAM), nonvolatile/Flash-type memory, or any other type of memory. In the illustrated example, program instructions and data implementing desired functions, such as perception-based suspension control module 614, are shown stored within the non-transitory computer readable memory. In other examples, program instructions, and/or data may be received, sent or stored on different types of computer-accessible media, such as non-transitory media, or on similar media separate from the non-transitory computer readable media. Generally speaking, a non-transitory, CRM 612 may include storage media or memory media, such as flash memory (e.g., solid-state memory), magnetic or optical media (e.g., a disk) coupled to a vehicle operation control system via an input/output (I/O) interface 616. Program instructions and data stored via a non-transitory CRM 612 may be transmitted by transmission media or signals such as electrical, electromagnetic, or digital signals, which may be conveyed via a communication medium such as a network and/or a wireless link, such as may be implemented via one or more network interfaces 618.

The network interface(s) 618 may be configured to enable communications between the computing device 604 of the vehicle 602 and a global map server, such as global map server 306 over a network. Such network interface(s) 618 may include one or more network interface controllers (NICs) or other types of transceiver devices to send and receive communications over a network. In various examples, the network interface(s) 618 may also include a mobile network interface to enable communication between the computing device 604 and the global map server over a mobile communication network connection (e.g., global system for mobile communications network (GSM), code division multiple access (CDMA), etc.). Additionally, or alternatively, the network interface(s) 618 may include one or more proximity interfaces, which can further include hardware and software to communicate via a proximity network, to further enable communications with computing devices of other vehicles, such as the fleet of vehicles depicted in FIG. 3. The proximity network may be peer-to-peer, wireless USB, Bluetooth, IrDA, Z-Wave, body area, or any other wired or wireless path based on the proximity of at least two computing devices. Proximity can be determined by wired connections and/or proximity sensors. In the proximity network, the vehicles 602 can share data between each other via a proximity network.

In at least one example, the I/O interface 616 may be configured to coordinate I/O traffic between the processor(s) 610, the non-transitory CRM 612, input devices 620, and output devices 622, the network interface(s) 618, and/or other peripheral interfaces. In some examples, the I/O interface 616 may perform any necessary protocol, timing or other data transformations to convert data signals from one component (e.g., the non-transitory CRM 612) into a format suitable for use by another component (e.g., processor(s) 610). In some examples, the I/O interface 616 may include support for devices attached through various types of peripheral buses, such as a variant of the Peripheral Component Interconnect (PCI) bus standard or the Universal Serial Bus (USB) standard, for example. In some examples, the function of the I/O interface 616 may be split into two or more separate components, such as a north bridge and a south bridge, for example. Also, in some examples, some or all of the functionality of the I/O interface 616, such as an interface to the non-transitory CRM 612, may be incorporated directly into the processor(s).

As discussed above, the computing device 604 may include a perception-based suspension control module 614 configured to receive and process real-time sensor data (e.g., perception and/or location sensor data). In various examples, the data may include raw sensor data from one or more sensors 624 on the vehicle 602. The sensor(s) 624 may include cameras, LIDAR sensors, RADAR sensors, ultrasonic transducers, GPS sensors, INS sensors, IMUs, gyroscopes, rotary encoders, linear encoders, accelerometers, magnetometers, microphones, weather sensors, and/or other types of sensors for operating and/or controlling the vehicle and/or for suspension system control. In some examples, the raw sensor data may be data collected by the computing device 604 to assist in the operation and/or control of the vehicle 602.

The sensor(s) 624 may capture data in a field of view of the sensors. In various examples, the sensor(s) 624 may be configured to capture data related to deformations on the road, such as images of a road surface and/or positions of deformations relative to the sensor(s) 624 and/or vehicle 602. In some examples, the sensor(s) 624 may be configured to capture additional data, such as that unrelated to the road (e.g., data corresponding to areas outside a road boundary, pedestrians, vehicles, and/or other objects in the environment other than the road surface). In such examples, the computing device 604, such as via the perception-based suspension control module 614, may be configured to filter out the data unrelated to the road.

The sensor(s) 624 may capture data, and send the sensor data to the perception-based suspension control module 614 for processing. In various examples, the sensors 624 may perform pre-processing on the sensor data prior to sending the data to the perception-based suspension control module 614. In some examples, the sensor data may include information (e.g., location, orientation, etc.) about a particular sensor 624 from which it was captured, a time of capture, or the like. In some examples, the perception-based suspension control module 614 may include a height map module 626 configured to receive a global height map from a global map server. The height map module 626 may be configured to localize the computing device 604 on the global height map. In some examples, the localization may be based on input from one or more navigation and/or motion sensors. The navigation and/or motion sensor(s) may comprise sensors 624, and/or they may be other sensors located on the vehicle 602 and configured to assist in determining a location of the computing device.

Additionally, or alternatively, the height map module 626 may use visual sensor data to localize the computing device on the global height map. The height map module 626 may receive images and/or distance data (e.g., camera input, LIDAR input, RADAR input, etc.). The height map module 626 may compare the images and/or distance data to the global height map data to determine a location of the vehicle on the global height map. In some examples, the height map module 626 may first use navigation and/or motion sensors to determine a general location of the computing device, and then use visual sensor data to narrow the location to a more precise location. In various examples, the height map module 626 may use the visual sensor data to localize the computing device based on a failure and/or malfunction (e.g., providing false data) of one or more of the navigation and/or motion sensors.

In some examples, the height map module 626 may determine a location of the computing device on the global height map using feedback input from the suspension systems. In such examples, the height map module 626 may use a particle filter or other estimation technique to correlate accelerations experienced by the suspension systems to the deformations on the global height map. In other words, the height map module 626 may map the accelerations to a profile, and localize the vehicle based on a comparison of the profile to a deformation (e.g., depression and/or raised section) signature of the road. Using the feedback input, the height map module 626 may be configured to localize the computing device 604 upon loss or degradation of a vehicle perception system (e.g., visual sensor input).

In various examples, based on the location, the computing device may determine a trajectory of the vehicle 602 (and computing device 604). The trajectory of the vehicle 602 may be a direction of movement of the vehicle. Based on the location and trajectory of the vehicle 602, the height map module 626 may determine one or more tracks of the vehicle, such as tracks 104, relative to the global height map. The height map module 626 may evaluate the tracks on the global height map, and determine if one or more deformations, such as deformation 108, are present in a track. As discussed, the deformation(s) may include depressions and/or raised sections on the road surface.

In various examples, the height map module 626 may identify deformation(s) in the vehicle tracks, and may send deformation information to the suspension controller. In some examples the height map module 626 may compare global height map data to the captured sensor data corresponding to the same area, and may validate the existence of the deformation. In various examples, the height map module 626 may compare raw sensor data to the global height map.

In some examples, the height map module 626 may build a local height map, and may compare the local height map to a corresponding area on the global height map. In such examples, based on a location of the computing device, and a known location and/or orientation of the sensor(s) 624, the height map module 626 may determine one or more points. The height map module 626 may then infer a mesh representation of the point(s) to generate the local height map. The local height map may include a 2.5 or 3D model of the road surface proximate to the vehicle 602. The height map module 626 may use location data to determine areas associated with the local height map. The height map module 626 may identify the corresponding areas on the global height map.

In various examples, the height map module 626 may be configured to send the local height map to the global map server. As discussed above, the global map server may generate and/or update the global height map based on the local height map data collected from a plurality of vehicles 102. In various examples, the height map module 626 may be configured to communicate deformation data to the suspension controller 628. The suspension controller may be operably coupled to suspensions 608. Suspensions 608 may include one or more components, such as tires, wheels 606, shock absorbers, control arms, sway bars, torsion bars, and/or other components configured to negate effects of the deformations.

The suspension controller 628 may be configured to evaluate the deformation input from the height map module 626, and calculate one or more adjustments to make to the component(s) of the relevant suspension 608 (i.e., the suspension(s) 608 to be affected by the deformation). The suspension controller 628 may calculate the adjustment(s) using one or more algorithms. In at least one example, the suspension controller 628 may use a Sky-Hook algorithm. In some examples, the adjustments made to two suspensions 608 in a track identified as encountering a deformation may be the same. In some examples, the adjustments made to two suspensions in a track may be different. In such examples, the difference may be based on various factors, such as a center of mass of the vehicle 602, a presence of occupants in the vehicle 602, a location of the occupants, and other factors. The adjustments made to two suspension systems in different tracks may be the same or they may be different, based on the deformation and/or the trajectory. For example, a vehicle 102 may approach a speed bump with a substantially perpendicular trajectory. The suspension controller 628 may calculate a first set of adjustments (i.e., adjustments for one or more components) to make to the left and right front suspensions. The suspension controller 628 may receive an indication, such as from one or more sensors 624, that two occupants are located in a rear portion of the vehicle. Based on the indication, the suspension controller 628 may calculate a second set of adjustments to make to the left and right rear suspensions, which may be different adjustments than those made to the front suspension.

In various examples, the suspension controller 628 may be configured to send signals to the relevant suspension 608 to cause the one or more components to adjust for the deformation. In some examples, the suspension controller 628 may be configured to send signals directly to the respective components of the suspension 608. The signal may include an adjustment (e.g., type and/or amount) to make to each relevant component, a time to implement the adjustment, and/or a length of time to maintain the adjustment.

In various examples, the suspension controller 628 may receive deformation data from the height map module 626, and may determine that the deformation is, in whole or in part, avoidable. Based on a determination that the deformation may be avoidable, the suspension controller 628 can send deformation avoidance data to a vehicle control system, such as vehicle control system 570. The deformation avoidance data may include a course to steer around the deformation, a size, a shape, dimensions, and/or a location of the deformation. The vehicle control system may thus adjust the course (e.g., series of trajectories) of the vehicle to avoid the deformation, and reestablish on an original course or a course substantially similar to the original course.

Additionally, the suspension controller 628 may calculate adjustments to make to components of the suspensions 608 based on the deformation avoidance maneuvering. The suspension controller 628 may thus be configured to negate the effects of vehicle maneuvering. For example, the deformation avoidance may include a slight swerve (i.e., change in trajectory) to the left, which may compress shock absorbers of the left side suspensions. The suspension controller 628 may calculate an additional stiffness to apply to the shock absorbers on the left side, to negate the effects of the maneuvering at the appropriate time. Similarly, to establish itself back on course, the vehicle may swerve slightly back to the right. The suspension controller 628 may send signals to the shock absorbers on the right side at the appropriate time, to negate the effects of the right swerve.

Additionally, or in the alternative, suspension controller 628 may adjust components of the suspensions 608 based on analysis of sections of the height map. As a non-limiting example, the height map may indicate that the vehicle is about to traverse a rough terrain (e.g. cobblestones, or any other repeating pattern of deformations). A rough terrain may be indicated by Fourier transforms, wavelet transforms, or other analysis of the height map directly proceeding the vehicle which indicates a roughness. As such, the suspension controller 628 may adjust a high frequency response component (as opposed to low frequency response components) of suspensions 608 to provide a smooth ride over such a terrain.

In various examples, the suspension controller 628 may be configured to receive feedback input from one or more feedback sensors of the suspensions 608. The feedback sensor(s) may include accelerometers, gyroscopes, magnetometers IMUs, or other sensors configured to measure linear and/or angular motion. The feedback input may include unanticipated movement of a wheel 606 and/or tire upon encountering the deformation. In some examples, the feedback input may include a location of the tire coupled to the wheel 606 at the time of the unanticipated movement.

In some examples, the suspension controller 628 may use the feedback to update algorithms related to suspension 608 adjustments. For example, the right front tire of vehicle 602 may drive over the deformation, and the wheel may drop 0.5 cm more than anticipated. The feedback sensors may capture data related to the wheel drop and send it to the suspension controller 628. The suspension controller 628 may use the feedback input to adjust the algorithms to increase the stiffness of the suspension system the next time the vehicle encounters a similar scenario.

Additionally, or alternatively, based on the feedback input, the suspension controller 628 may determine that the deformation has a different shape and/or size than anticipated based on global height map data. In various examples, the different shape and/or size may be determined based on the unanticipated movement of the wheel and/or tire. The suspension controller 628 may send the real-time deformation data as update data to the global map server. In some examples, the update data may be sent based on detection of a difference. In some examples, the update data may be sent based on the difference in size and/or shape exceeding a threshold amount. The global map server may receive the data, and update the global height map accordingly. In some examples, such a discrepancy may be reported as an error in sensor calibration or functioning.

Figure 7:
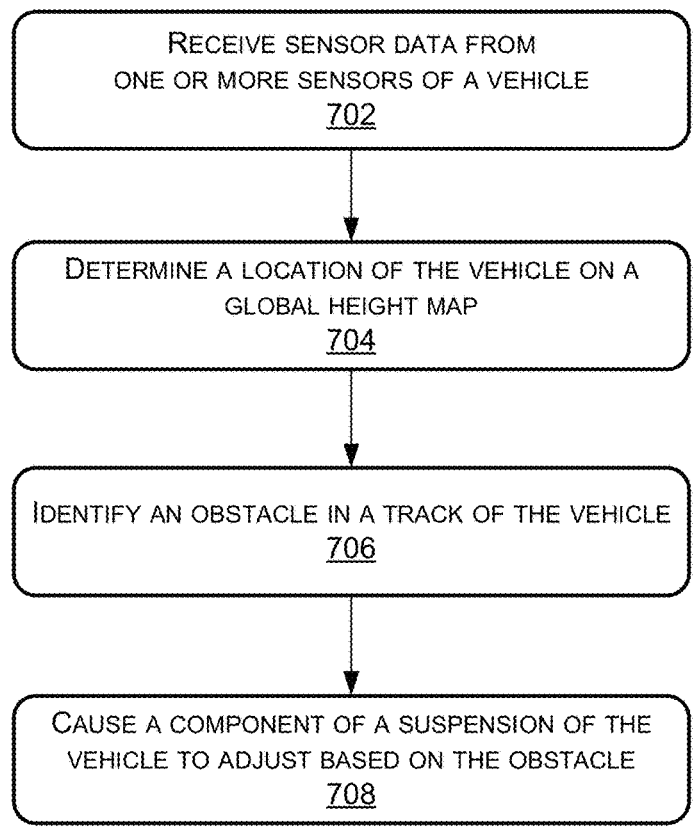
FIG. 7 is a flow diagram of an example process for controlling a vehicle suspension system.
Figure 8:
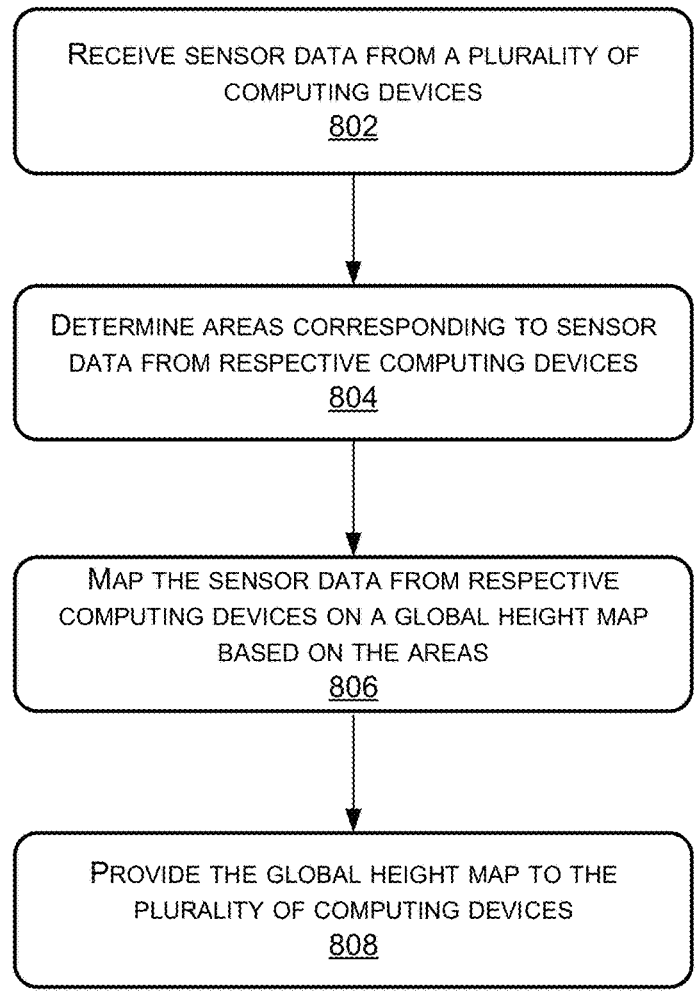
FIG. 8 is a flow diagram of an example process for building and distributing a global height map.
Figure 9:
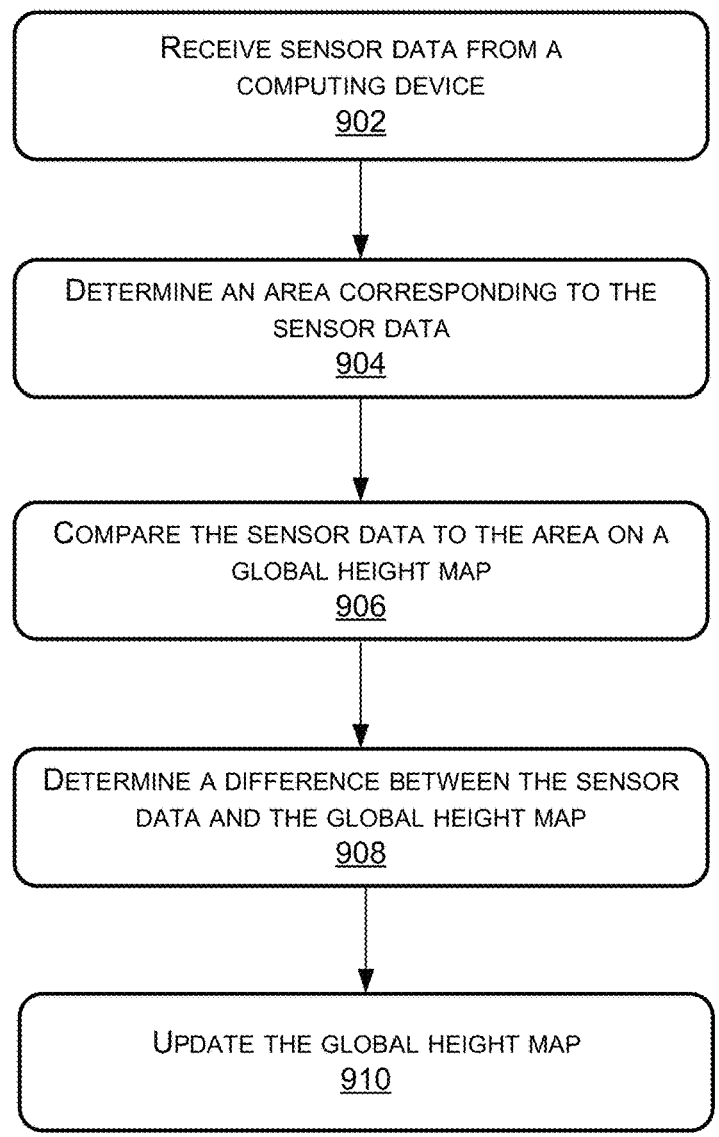
FIG. 9 is a flow diagram of an example process for updating a global height map.

FIGS. 7-9 are flow diagrams of example processes 700, 800, and 900 illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 7 is a flow diagram of an illustrative process 700 for adjusting a suspension of a vehicle based on an identified deformation. In various examples, the process 700 may be performed by a computing device of a vehicle, such as computing device 308, 604.

At 702, the computing device may receive data from one or more perception sensors. The perception sensors may include cameras, LIDAR sensors, ultrasonic transducers, RADAR sensors, or the like. The data may include depictions of the road surface and/or other surfaces or objects in proximity to the vehicle.

In some examples, the computing device may filter out data corresponding to surfaces and/or objects other than the road surface. In such examples, the computing device may be configured to increase computing power available to process the data associated with the road surface.

At 704, the computing device may be configured to determine a location (i.e., localize) of the vehicle (and the computing device) on a global height map. The global height map may comprise a high resolution 2.5 or 3D map of the road surface. The global height map may be generated by a global map server based on data provided by multiple computing devices (e.g., mobile computing devices).

In some examples, the location of the vehicle may be based on input from one or more navigation and/or motion sensors. Navigation sensors may include GPS sensors, INS sensors, SLAM based systems, or the like. Motion sensors may include rotary encoders, IMUs, or the like. Additionally, or alternatively, the location of the vehicle may be based on data from one or more perception sensors. The perception sensor data may include images and/or distance data (e.g., LIDAR input, RADAR input, etc.). The computing device may compare the images and/or distance data to the global height map data to determine a precise location of the vehicle on the global height map.

In some examples, the computing device may first use navigation and/or motion sensors to determine a general location of the computing device, and then use visual sensor data to narrow the location to a more precise location. In various examples, the computing device may use the visual sensor data to localize the computing device based on a failure and/or malfunction (e.g., providing false data) of one or more of the navigation and/or motion sensors.

In some examples, the computing device may determine a location of the vehicle on the global height map using feedback input from the suspension systems. In such examples, the computing device may use a particle filter or other estimation technique to correlate accelerations experienced by the suspension systems to deformations (e.g., depressions and/or raised sections) on the global height map. In other words, the computing device may map the accelerations to a profile, and localize the vehicle based on a comparison of the profile to a deformation signature of the road. Accordingly, the computing device may be configured to localize the computing device upon loss or degradation of a vehicle perception and/or navigation system.

At 706, the computing device may identify a deformation in a track of the vehicle. The deformations may include depressions, such as potholes, dips in the road, depressed man hole covers, or other deviations below the road surface. The deformations may also include raised sections, such as speed bumps, lane markers, or other deviations above the road surface. Additionally, or in the alternative, the computing device may calculate a roughness of the road.

In various examples, the computing device may first calculate and/or receive a trajectory of the vehicle. In some examples, the computing device may evaluate motion sensor data to calculate the trajectory. In such examples, the computing device may determine a trajectory based on linear and angular accelerations captured by the motion sensors. In some examples, the computing device may calculate the trajectory based on navigation sensor data, such as by a change in location over a period of time (e.g., 50 ms, 1 s, 5 s, etc.).

In various examples, the computing device may determine one or more tracks of the vehicle based in part on the location and/or the trajectory. The track(s) may be defined by the path the tires of the vehicle will travel relative to the road surface. The track(s) may be determined based on relative distances from the computing device and/or respective locations of the tires on the vehicle. In some examples, the computing device may evaluate the one or more tracks to identify a deformation in a track. In various examples, the computing device may identify relevant suspensions which may be affected by the deformation.

In some examples, the computing device may determine a time in which the relevant suspensions may encounter the deformation. The time may be based on a speed of the vehicle, a distance to the deformation and/or the course (i.e., series of trajectories). Similar to the trajectory calculation, the computing device may calculate the speed and distance to the deformation based on input from one or more sensors on the vehicle. In some examples, the computing device may determine a roughness of a section of the road which the vehicle is about to traverse.

At 708, the computing device may cause a component of a suspension of the vehicle to adjust based on the deformation and/or the roughness of the road. The one or more components may include active and/or semi-active suspension system components, such as shock absorbers (e.g., damper, spring, linear actuator, etc.), control arms, sway bars, torsion bars, and the like. In various examples, the computing device may send a signal to the relevant suspensions to cause the component to adjust for the deformation and/or roughness. The signal may include an adjustment to make to each relevant component, a time to implement the adjustment, and/or a length of time to maintain the adjustment. The adjustments may be calculated using one or more control algorithms. In some examples, the one or more control algorithms may include a Skyhook algorithm.

In some examples, the adjustment to the components of the front suspension system may be different than the adjustment to the components of the rear suspension system. In some examples, the adjustments to the front and rear suspension systems may be the same. In some examples, the adjustment to the components of a right-side suspension may be different than the adjustment to the components of a left-side suspension. In some examples, the adjustment to the components of the right-side and left-side suspensions may be substantially the same.

In various examples, the computing device may determine that the object may be avoidable, in whole or in part. Based on a determination that the deformation may be avoidable, the computing device can provide deformation avoidance data to a vehicle control system. The vehicle control system may thus adjust the course (e.g., series of trajectories) of the vehicle to avoid the deformation, and reestablish on an original course or a course substantially similar to the original course (e.g., same general direction, but with tracks of the vehicle 102 in different positions in the lane). In such examples, the computing device may cause one or more components to adjust based on a maneuver to adjust the course and/or reestablish on the original or a similar course.

FIG. 8 is a flow diagram of an illustrative process 800 for generating a global height map. In various examples, the process 800 may be performed by a computing device, such as a global map server device (e.g., global map server device 400).

At 802, the computing device may receive sensor data from a plurality of computing devices. The computing devices may be those associated with vehicles, or other mobile sensors, and/or computing devices associated with stationary sensors. The sensor data may include perception data, such as that captured by cameras, LIDAR sensors, RADAR sensors, or the like. The sensor data may include raw sensor data from one or more sensors and/or data configured as a local height map.

The sensor data may include depictions of a road surface and/or other surfaces or objects in proximity to the vehicle. In some examples, the computing device may filter out data corresponding to surfaces and/or objects other than the road surface. In such examples, the computing device may be configured to increase computing power available to process the data associated with the road surface.

At 804, the computing device determines areas corresponding to the sensor data from respective computing devices. The areas may include various locations associated with the sensor data. In some examples, the locations may be associated with one or more points of a height map. The locations based on latitudes and longitudes, grid coordinates, or other system capable of mapping. The areas corresponding to the sensor data from the plurality of computing devices may be adjacent, non-adjacent, and/or overlapping one another. The areas may include boundaries, such as those defined by a road surface.

At 806, the computing device may map the sensor data from the plurality of computing devices on a global height map based on the respective areas. The global height map may comprise a 2.5 or 3D high resolution map of a large area (e.g., combination of areas). The global height map may comprise a representation of points, each of the points including a height.

In various examples, the computing device may validate the accuracy of the sensor data prior to mapping. In such examples, the computing device may validate the sensor data based on a confidence level and/or an uncertainty of the data provided by the source, a number of sources providing the sensor data, a quality of the sensors, a resolution and/or clarity of the sensor data, identified aberrant data, or the like.

In various examples, the computing device may identify one or more deformations and/or a roughness in the global height map. The deformation(s) may include deviations to the substantially flat road surface, such as depressions and/or raised sections. In various examples, the computing device may use machine learning techniques and/or human input to classify the deformation(s) on the global height map.

At 808, the computing device may provide the global height map to the plurality of computing devices. In various examples, the global height map may be used by the plurality of computing devices or a perception based suspension control system.

FIG. 9 is a flow diagram of an illustrative process 900 for updating a global height map. In various examples, the process 900 may be performed by a computing device, such as a global map server device (e.g., global map server device 400).

At 902, the computing device may receive sensor data from a computing device. The computing device may be a computing device associated with a vehicle, or one or more other mobile sensors, and/or a computing device associated with one or more stationary sensor. The sensor data may include perception data, such as that captured by cameras, LIDAR sensors, RADAR sensors, or the like. The sensor data may include raw sensor data from one or more sensors and/or data configured as a local height map. In various examples, the sensor data may include representations of points, such as those on the local height map.

The sensor data may include depictions of a road surface and/or other surfaces or objects in proximity to the vehicle. In some examples, the computing device may filter out data corresponding to surfaces and/or objects other than the road surface. In such examples, the computing device may be configured to increase computing power available to process the data associated with the road surface.

At 904, the computing device may determine an area corresponding to the sensor data. In various examples, the area may be an area of the road surface, bounded by one or more boundaries. The area may include various locations associated with the sensor data. In some examples, the locations may correspond to representations of points of a height map. The locations may be based on latitudes and longitudes, grid coordinates, or other system capable of mapping.

At 906, the computing device may compare the sensor data to the corresponding area on a global height map. In various examples, the comparison may be to respective heights of representations of a point.

At 908, the computing device may determine a difference between the sensor data and the global height map. The difference may include differences between the representations of the points in the sensor data and points of the global height map. The difference may be in location, height, or other factor related to the representation of a point.

In various examples, the computing device may validate the sensor data prior to determining a difference. In such examples, the computing device may validate the sensor data based on a number of computing devices providing the sensor data, a quality of the sensors, a resolution and/or clarity of the sensor data, or the like.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other examples may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for adjusting a suspension system based on perception data have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to examples that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A vehicle comprising:
    a body;
    one or more sensors coupled to the body, the one or more sensors comprising a light detection and ranging (LIDAR) sensor;
    a plurality of wheels;
    a plurality of suspensions, each suspension of the plurality of suspensions being disposed between the body and a respective wheel of the plurality of wheels, each suspension comprising one or more suspension components;
    one or more processors; and
    one or more non-transitory computer readable media storing computer-executable instructions that, when executed by the one or more processors, cause the vehicle to perform operations comprising:
        receiving, from a global map server, at least a portion of a previously computed global height map comprising a representation of a road surface and a global uncertainty associated with a point on the global height map;
        determining, based at least in part on data received from the one or more sensors, a location of the vehicle with respect to the global height map;
        identifying, based at least in part on the one or more sensors, a local height map comprising a local representation of the road surface and a local uncertainty, the local height map indicative of a deformation in a track of the vehicle and differing, at least in part, from the global height map;
        identifying a wheel of the plurality of wheels corresponding to the track;
        causing a suspension of the plurality of suspensions coupled to the wheel to adjust one or more suspension components based at least in part on the deformation in the track of the vehicle, the global uncertainty, and the local uncertainty; and
        transmitting, to the global map server, the local height map.

2. The vehicle as claim 1 recites, wherein the identifying the wheel comprises identifying a first wheel and a first suspension coupled to the first wheel, and the operations further comprise:
    calculating a first adjustment to make to a first suspension component of the first suspension;
    determining a first time associated with the first adjustment; and
    sending a signal to the first suspension to cause the first suspension component to adjust at the first time.

3. The vehicle as claim 2 recites, further comprising,
    calculating a second adjustment to make to a second suspension component of the second suspension;
    determining a second time associated with the second adjustment; and
    sending a signal to the second suspension to cause the second suspension component to adjust at the second time.

4. The vehicle as claim 3 recites, wherein the first adjustment to the first suspension component is same as the second adjustment to the second suspension component.

5. The vehicle as claim 3 recites, wherein the second adjustment is based at least in part on feedback responsive to the first wheel traversing the deformation with the first adjustment.

6. The vehicle as claim 1 recites, wherein the one or more suspension components comprises at least one of:
    a damper;
    a linear actuator;
    a spring;

a stabilizer bar;
a torsion bar; or
a control arm.

7. The vehicle as claim 1 recites, wherein the one or more suspension components comprise semi-active or active components of the vehicle suspension system.

8. A method comprising:
receiving a height map comprising a representation of a road surface and a global uncertainty associated with one or more points on the height map;
receiving, at a computing device associated with a vehicle, sensor data from one or more sensors of the vehicle;
determining a location of the vehicle on the height map based at least in part on the sensor data;
identifying one or more of a deformation in a track of the vehicle or a roughness of a terrain based at least in part on the height map;
outputting a local uncertainty associated with the deformation in the track of the vehicle or the roughness of the terrain for updating of the height map; and
causing a component of a vehicle suspension system to adjust based at least in part on the deformation, the local uncertainty, the global uncertainty, and the roughness.

9. The method as claim 8 recites, wherein the method further comprises:
determining a trajectory of the vehicle; and
determining the track of the vehicle based at least in part on the trajectory and the location.

10. The method as claim 8 recites, wherein the sensor data comprises perception data captured by one or more perception sensors and wherein the determining the location of the vehicle on the height map comprises:
determining a position and orientation of the perception sensor with respect to the vehicle;
identifying one or more points of the perception data, wherein the one or more points of the perception data correspond to heights of the road surface;
comparing the one or more points of the perception data to the one or more points on the height map; and
calculating the location of the vehicle based on the position and the orientation of the perception sensor and a comparison of the one or more points of the perception data to the one or more points on the height map.

11. The method as claim 8 recites, wherein the one or more sensors comprise one or more perception sensors, the method further comprising:
receiving perception data from the one or more perception sensors, the perception data comprising a representation of the road surface;
identifying a plurality of points in the perception data, wherein each of the plurality of points corresponds to a height of the road surface; and
combining the plurality of points into a local height map.

12. The method as claim 11 recites, wherein the height map is a global height map, the method further comprising:
comparing the local height map to the global height map;
determining that a representation of the deformation in the local height map is the same as the global height map; and
verifying a region of the global height map associated with the local height map.

13. The method as claim 11 recites, wherein the height map is a global height map, the method further comprising:
comparing the local height map to the global height map;
determining a difference between the local height map and the global height map; and
based at least in part on the difference, sending the local height map to the global map server to update the global height map.

14. The method as claim 13 recites, wherein the difference comprises at least one of:
a new deformation;
a lack of the deformation;
a change in height;
a change in dimension of the deformation; or
a change in shape of the deformation.

15. The method as claim 8 recites, further comprising:
determining that the deformation is avoidable;
calculating a course to steer to avoid the deformation;
causing the vehicle to steer the course,
wherein the causing the component of the vehicle suspension system to adjust is based at least in part on a change of course to avoid the deformation.

16. A system comprising:
one or more processors; and
one or more non-transitory computer readable media storing computer-executable instructions that, when executed by the one or more processors, cause the one or more processors to perform operations comprising:
receiving, from a global map server, a global height map comprising a representation of a road surface;
receiving sensor data from one or more sensors of a vehicle;
generating a local height map from the sensor data, the local height map including one or more points corresponding to heights of the road surface;
determining a local uncertainty of the one or more points, the local uncertainty based at least in part on a number of sensor modalities of the one or more sensors of the vehicle used to capture the sensor data;
outputting the local height map and the local uncertainty of the one or more points to the global map server for updating of the global height map, the global height map comprising one or more global uncertainties associated with one or more points of the global height map;
determining a location of the vehicle on the global height map;
identifying one or more of a deformation in a track of the vehicle or a roughness of a terrain based at least in part on the global height map; and
causing a suspension component of the vehicle to adjust based at least in part on the identifying, the local uncertainty, and the global uncertainty.

17. The system as claim 16 recites, wherein the identifying comprises identifying an deformation, the operations further comprising:
determining dimensions of the deformation;
calculating an adjustment to apply to the suspension component based at least in part on the dimensions;
calculating a time to apply the adjustment; and
sending a signal to the suspension to apply the adjustment to the suspension component at the time.

18. The system as claim 17 recites, wherein the adjustment is a first adjustment and the suspension component is a first suspension component, and the operations further comprise:
calculating a second adjustment to apply to a second suspension component based at least in part on the dimensions;
calculating a second time to apply the second adjustment;

sending a signal to the suspension to apply the second adjustment to the second suspension component at the second time.

19. The system as claim 16 recites, the operations further comprising:
    receiving feedback input from one or more feedback sensors of the suspension;
    determining, based at least in part on the feedback input, that a vehicle body experienced an inertial force exceeding a threshold inertial force based on an impact with the deformation; and
    updating an algorithm used to calculate the adjustment.

20. The system as claim 16 recites, the operations further comprising:
    evaluating the representation of the road surface to determine a roughness of the road surface;
    determining a baseline setting for the suspension based at least in part on the roughness of the road surface; and
    causing the suspension of the vehicle to adjust to the baseline setting.

21. The system as claim 16 recites, wherein the representation of the road surface comprises a 2.5-dimension or a 3-dimension high resolution representation of heights of the road surface.

* * * * *